US012468712B2

(12) United States Patent
Lal Das et al.

(10) Patent No.: US 12,468,712 B2
(45) Date of Patent: Nov. 11, 2025

(54) DEVICE-AGNOSTIC FRAMEWORK TO MEASURE RELIABILITY DURING USER INTERACTIONS

(71) Applicant: GOOGLE LLC, Mountain View, CA (US)

(72) Inventors: Shashwat Lal Das, San Francisco, CA (US); Prithwish Mukherjee, Mountain View, CA (US); Xiaoyi Sheng, Sunnyvale, CA (US); Zilong Huang, Mountain View, CA (US); Prashant Gupta, Mountain View, CA (US); Alexander Sparber, Waedenswil (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/642,318

(22) Filed: Apr. 22, 2024

(65) Prior Publication Data

US 2025/0328534 A1     Oct. 23, 2025

(51) Int. Cl.
    *G06F 16/00*          (2019.01)
    *G06F 16/2457*     (2019.01)
    *G06F 16/28*        (2019.01)

(52) U.S. Cl.
    CPC ...... *G06F 16/24573* (2019.01); *G06F 16/285* (2019.01)

(58) Field of Classification Search
    CPC .................. G06F 16/24573; G06F 16/285
    USPC ............................................. 707/736
    See application file for complete search history.

(56) References Cited

U.S. PATENT DOCUMENTS

| 10,860,588 | B2 * | 12/2020 | Lyubimov | ......... G06F 16/90324 |
| | | | | 707/707 |
| 12,309,185 | B1 * | 5/2025 | Skarphedinsson | ...... G06F 9/455 |
| | | | | 707/707 |
| 2018/0088967 | A1 | 3/2018 | Cooper et al. | |

OTHER PUBLICATIONS

Atterlonn et al., "GUI Performance Metrics Framework" KTH Royal Institute of Technology. 37 pages, dated 2019.

* cited by examiner

*Primary Examiner* — Alexandria Y Bromell
(74) *Attorney, Agent, or Firm* — Gray Ice Higdon

(57) ABSTRACT

Implementations relate to retrieving and processing metadata associated with a user query directed to an interactive assistant application. Implementations further relate to classifying the user query using labels assigned to invocation stage, input-receiving stage, response-receiving stage, and/or response-rendering stage of the user query that are determined based on processing the metadata associated with the user query. Whether the user query can be applied to evaluate a performance (e.g., surface reliability) of the interactive assistant application can be determined based on the classification of the user query.

9 Claims, 7 Drawing Sheets

DEVICE-AGNOSTIC FRAMEWORK TO MEASURE RELIABILITY DURING USER INTERACTIONS

BACKGROUND

Interactive software applications, such as "automated assistants" (also referred to as "conversational chatbots," "intelligent assistants," "interactive assistant", "interactive assistant application", etc.), are commonly used for user interactions and are increasingly gaining popularity. For example, a user can provide a user query (e.g., "what's the theory of general relativity") to an automated assistant using a spoken utterance (e.g., "Assistant, what's the theory of general relativity"), or other types of user input (e.g., typed input or touch input, etc.). The spoken utterance (e.g., "Assistant, what's the theory of general relativity") typically includes one or more invocation words/phrases (e.g., "Assistant") to invoke the automated assistant. If successfully invoked, the automated assistant can process textual natural language input (e.g., "what's the theory of general relativity" in natural language) derived from the spoken utterance (or typed input, etc.) as the user query, to generate an automated assistant response that responds to the user query. The automated assistant response can include natural language content that answers a user question (e.g., "what's the theory of general relativity") present in the user query, or can be execution of an assistant action (e.g., turn on light in the kitchen) that responds to a user command (e.g., "turn on the kitchen light") in the user query, etc.

Interactive software applications can be installed at a variety of devices, and different interactive software applications can include different components. For example, a first interactive software application may include no component that utilizes generative model(s) (e.g., a large language model, "LLM") for user interactions, while a second interactive software includes a component that is, or is in communication with, an LLM. As another example, the first interactive software may include a component that accesses a first LLM haven't been trained to utilize external service(s) (e.g., third-party APIs) in generating response(s), while the second interactive software relies on a second LLM that has been trained to utilize external service(s).

Due to the complexity and constant updates of components forming an interactive software application and due to the variations in components from one interactive software application to another, there is a need to develop metrics that can be universally applied to evaluate or track performance of these application(s). For example, evaluation metrics applicable for an interactive software application that has an older version which is NLU-based and a newer version which is LLM-based are desired, given the constant updates/development to interactive software application(s) to cope with emerging functionality and user needs. Moreover, existing metrics for evaluating an interactive software application often overestimate reliability of the interactive software application and do not specify issues in a surface infrastructure of the interactive software application that affects reliability of the interactive software application.

SUMMARY

Implementations disclosed herein relate to configuring metrics that evaluate, identify, and/or track misbehavior of a surface infrastructure of a system for user interactions (e.g., standalone applications, web-based applications, etc.). The system for user interactions can be, or can include, an interactive software application referred to as an "automated assistant," "conversational chatbot," "intelligent assistant," or "interactive assistant application," etc. In various implementations, the metrics disclosed herein can be applicable to evaluate performance of different interactive software applications (that have different components, etc.) in handling user queries. For instance, in some implementations, the metrics disclosed herein are applicable to identify and/or track surface misbehavior(s) of the system in different stages associated with the interactive software application when handling user queries. The surface misbehavior(s) can include, for instance, issues of the system for user interactions in opening a microphone, no response generated by the system within a reasonable period of time, etc. In various implementations, the metrics disclosed herein filter/exclude one or more user queries from a plurality of user queries collected/retrieved to evaluate the system for user interaction, where the one or more filtered/excluded user queries can be queries that are canceled by a human user by not the interactive software application. This ensures objective evaluation of the system (e.g., objective identification and notification of surface misbehaviors of the system), by excluding user queries that are not (or unsuccessfully) responded by the system due to subjective user behaviors (e.g., user changed mind).

In some implementations, the metrics disclosed herein can be applied to a first interactive software application having an automatic speech recognition (ASR) component, a natural language understanding (NLU) component, a fulfillment component, and/or a text-to-speech (TTS) component. Additionally, or alternatively, in some implementations, the metrics disclosed herein can be applied to a second interactive software application having the ASR component, a search component, and/or an LLM component. The components of the first or second interactive software application, however, are not limited to descriptions herein and can be in any applicable format. In some implementations, using the metrics disclosed herein, surface misbehavior of the system for user interactions can be detected, and a stage at which the surface misbehavior is detected can be identified, with alert generated and rendered (or delivered via text message, email, etc.). This way, surface misbehavior of the system for user interactions can be monitored and addressed, so that chances of misbehavior of the system for user interaction can be reduced. Moreover, as different interactive software applications can be divided into different and universally applicable stages (e.g., invocation, input, processing, response) as disclosed herein, the disclosed metrics can be applied to evaluate different interactive software applications, and/or to identify and report specific surface misbehaviors. This enables, for instance, monitoring and/or improvement of reliability of emerging interactive software applications while continuous monitoring and/or improvement of reliability of interactive software applications having older versions (or different components).

In various implementations, a method implemented using one or more processors is provided. The method includes: identifying metadata associated with a user query that is directed to an interactive assistant application; processing the metadata associated with the user query to determine a classification category to which the user query belongs. In some implementations, processing the metadata associated with the user query includes: determining a respective label, from a plurality of predefined labels, for each of one or more stages of the interactive assistant application towards or handling the user query, the one or more stages belonging to a plurality of predefined stages of the interactive assistant application, and determining the classification category based on the respective label for each of the one or more stages of the interactive assistant application handling the user query.

In some implementations, the plurality of predefined stages of the interactive assistant application include an invocation stage, an input-receiving stage, a response-generation stage, and a response-rendering stage, of the interactive assistant application that handles the user query. The input-receiving stage may also be referred to as "input" stage, "input-recognition" stage, etc. The response-generation stage may also be referred to as "response-receiving stage", "processing stage", "query processing stage", etc. The response-rendering stage may also be referred to as "responding stage" or "rendering stage", etc. The plurality of predefined stages are predefined for the interactive assistant application and can be universally applied to additional, different interactive assistant applications that have different components, etc.

In some implementations, the plurality of predefined labels assignable to each stage include a first label indicating a respective stage of the interactive assistant application handling the user query was completed within a corresponding threshold of time, and a second label indicating the respective stage of the interactive assistant application handling the user query was not completed or is completed but beyond the corresponding threshold of time. In some implementations, the plurality of predefined labels can further include a third label indicating that the respective stage of the interactive assistant application handing the user query renders the user query ineligible, and/or a fourth label indicating that the metadata associated with the user query is incomplete to classify the user query.

In some implementations, as a non-limiting example, the first label is a "good" label, the second label is a "bad" label, the third label is an "ineligible" label, and the fourth label is an "unknown" label.

In some implementations, determining the classification category based on the label for each of the one or more stages of the interactive assistant application handling the user query comprises: determining a first classification category for the user query based at least on each label for each of the plurality of predefined stages being the first label. The first classification category can indicate a satisfactory overall surface performance of the interactive assistant application handling the user query.

In some implementations, the first classification category is determined for the user query further based on a total period of time from invocation of the interactive assistant application to complete rendering of a response responsive to the user query satisfying a total threshold (e.g., 3 seconds).

In some implementations, determining the classification category based on the label for each of the one or more stages of the interactive assistant application handling the user query comprises: determining a second classification category for the user query based on at least one second label is determined for at least one of the plurality of predefined stages and based on no third or fourth label is determined for any of the plurality of predefined stages. The second classification category indicates an unsatisfactory overall surface performance of the interactive assistant application handling the user query.

In some implementations, determining the classification category based on the label for each of the one or more stages of the interactive assistant application handling the user query comprises: determining an ineligible classification category for the user query based on at least one ineligible label is determined for at least one of the plurality of predefined stages. The ineligible classification category indicates the user query is ineligible for use to evaluate a surface reliability of the interactive assistant application.

In some implementations, determining the classification category based on the label for each of the one or more stages of the interactive assistant application handling the user query comprises: determining a fourth classification category for the user query based on at least one fourth label is determined for at least one of the plurality of predefined stages. The fourth classification category indicates that key information is missing from the metadata associated with the user query.

In some implementations, optionally, the method further includes: generating a classification label for the user query that indicates the classification category, and/or storing the classification label in association with the user query, e.g., in a user query database.

In some implementations, the method further includes: receiving a user request to evaluate the user query (e.g., evaluate whether the user query is eligible for use to determine a surface reliability of the interactive assistant application). In some implementations, identifying the metadata associated with the user query is in response to receiving the user request to evaluate the user query.

In some implementations, the method further includes: generating, based on the classification category (or the classification label that classifies the user query), a response that is responsive to the user request to evaluate the user query. In some implementations, the response indicates or includes an alert to one or more entities (e.g., staff, managers, or researchers, etc.) tasked with overseeing a particular stage of the plurality of predefined stages of the interactive assistant application handling the user query. The alert can be generated and rendered (e.g., via one or more client devices) in response to the particular stage of the plurality of predefined stages being determined to have a second label indicating unsatisfactory handling of the user query by the interactive assistant application during the particular stage.

In some implementations, the method further includes: determining whether to apply the user query to evaluate a surface reliability of the interactive assistant application based on the classification category (or the classification label that classifies the user query).

In some implementations, optionally, the method further includes: excluding the user query from being used to evaluate the surface reliability of the interactive assistant application based on the classification label that classifies the user query corresponds to an "ineligible" classification label.

In various implementations, an additional method implemented using one or more processors is provided. The additional method includes: identifying a plurality of user queries directed to an interactive assistant application. The additional method further includes: for each of the plurality of user queries: identifying metadata associated with a respective user query from the plurality of user queries, and processing the metadata associated with the respective user query to determine a classification category to which the respective user query belongs. In some implementations, processing the metadata associated with the respective user query includes: determining a respective label, from a plurality of predefined labels, for each of one or more stages of the interactive assistant application handling the respective user query, wherein the one or more stages belong to a plurality of predefined stages of the interactive assistant application; and determining the classification category based on the respective label for each of the one or more stages of the interactive assistant application handling the respective user query. In some implementations, the method further includes: determining a surface reliability of the interactive assistant application based on the classification categories determined for each of the plurality of user queries.

In some implementations, determining the surface reliability of the interactive assistant application can be performed for a particular surface (e.g., auto vs. mobile vs. smart displays vs. wearable devices, etc.). In this case, determining the surface reliability of the interactive assistant application can be based on the classification categories determined for a subset of the plurality of user queries that were received via the particular surface.

In some implementations, the plurality of predefined stages of the interactive assistant application include an invocation stage, an input-receiving stage, a response-receiving stage, and a response-rendering stage.

In some implementations, the plurality of predefined labels include a first label indicating a respective stage of the interactive assistant application handling the user query was completed within a corresponding threshold of time, and a second label indicating the respective stage of the interactive assistant application handling the user query was not completed, or is completed but beyond the corresponding threshold of time. In some implementations, the plurality of predefined labels further include a third label indicating that the respective stage of the interactive assistant application handling the user query renders the user query ineligible, and/or a fourth label indicating that the metadata associated with the user query is incomplete to classify the user query (or one or more stages thereof).

In some implementations, determining the classification category based on the respective label for each of the one or more stages of the interactive assistant application handling the respective user query includes: determining a first classification category for the respective user query based at least on each label for each of the plurality of predefined stages being the first label. The first classification category can indicate a satisfactory overall surface performance of the interactive assistant application handling the respective user query. In some implementations, determining a second classification category for the respective user query based on at least one second label being determined for at least one of the plurality of predefined stages. The second classification category can indicate an unsatisfactory overall surface performance of the interactive assistant application handling the respective user query.

In some implementations, determining the surface reliability of the interactive assistant application based on the classification categories determined for the subset of the plurality of user queries that were received via the particular surface includes: determining a ratio between a first quantity of user queries from the subset that each corresponds to the first classification category and a total quantity of user queries from the subset.

In some implementations, the plurality of predefined labels further include a third label indicating that the respective stage of the interactive assistant application handling the user query renders the user query ineligible, and/or a fourth label indicating that the metadata associated with the user query misses information to classify the respective stage of the interactive assistant application for the user query.

In some implementations, the subset of user queries include no user query for which a third or fourth label has been determined, assigned, or be associated with.

The preceding is presented as an overview of only some implementations disclosed herein. These and other implementations are disclosed in additional detail herein. For example, additional and/or alternative implementations are disclosed herein such as taking into consideration authentication issues and/or network issues encountered by the interactive assistant application ("assistant") in handling user queries, when determining a performance (e.g., surface reliability) of the interactive assistant application.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

DETAILED DESCRIPTION

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

Figure 1A:
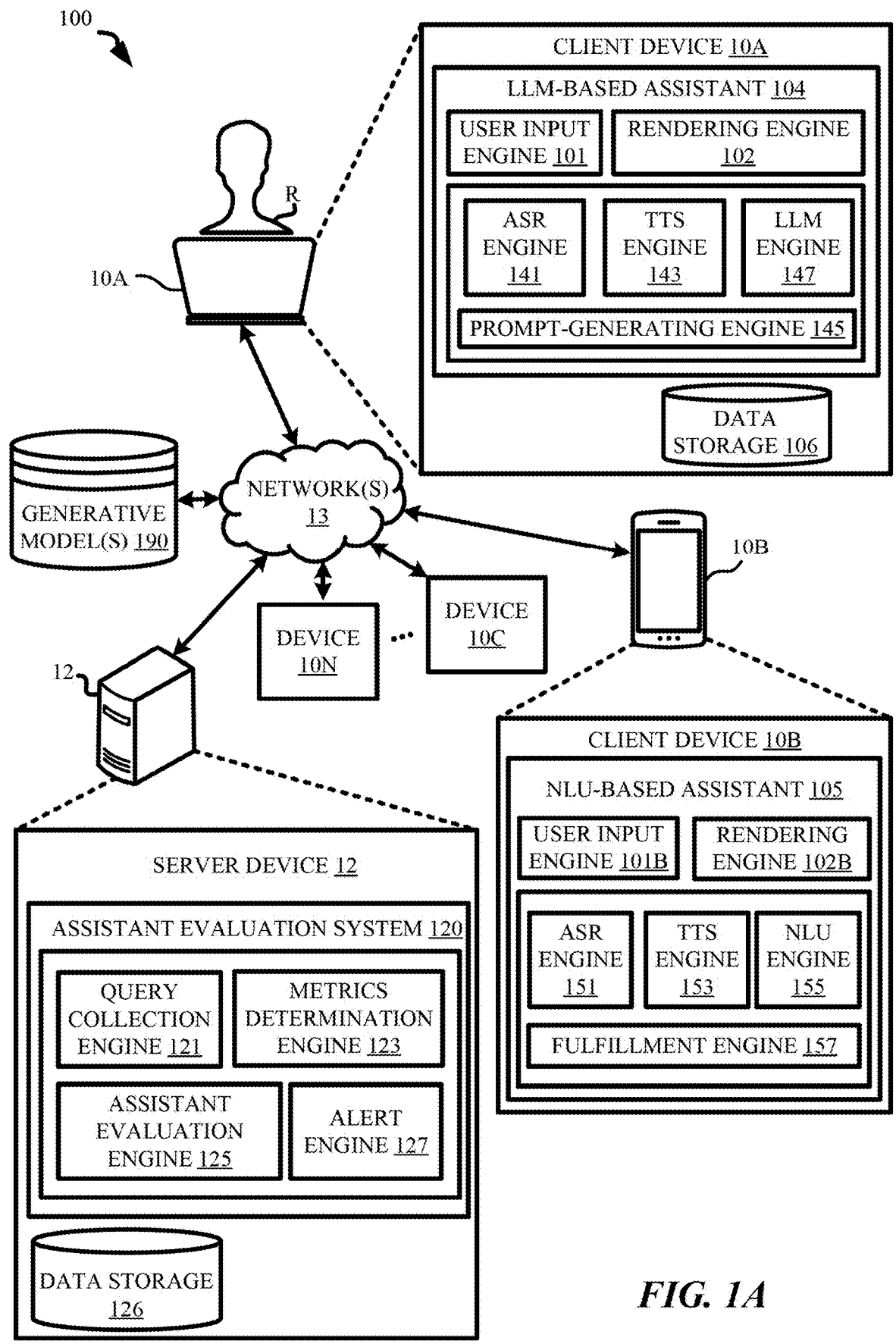
FIG. 1A depicts a block diagram of an example environment that demonstrates various aspects of the present disclosure, and in which some implementations disclosed herein can be implemented.

FIG. 1A is a block diagram of an example environment 100 that demonstrates various aspects of the present disclosure, and in which implementations disclosed herein may be implemented. As shown in FIG. 1A, the environment 100 can include one or more client computing devices ("client device", e.g., 10A, 10B, 10C, . . . , 10N), and a server computing device 12 ("server device") that is in communication with one or more of the client computing devices 10A~10N via one or more networks 13. The one or more networks 13 can include, for example, a local area network (LAN), a wide area network (WAN) such as the Internet, and/or any other appropriate network.

The one or more client computing devices (e.g., 10A, 10B, . . . , 10N) can respectively be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a smart watch, a virtual or augmented reality computing device), and the present disclosure is not limited thereto.

In some implementations, the client computing device 10A (and/or other client computing device(s)) can include one or more applications installed locally at (or otherwise accessible via) the client computing device 10, and/or a data storage 106. The one or more applications of the client computing device 10A can include, for instance, an LLM-based assistant 104 having (or otherwise accessing) a user input engine 101 and/or a rendering engine 102.

The user input engine 101 can be configured to detect user input provided by a user (e.g., user R) of the client computing device 10A. The user input may be provided by the user using one or more user interface input devices, such as a keyboard, a touch screen, a microphone, etc. The user input can be typed input, touch input, audible input, or any other applicable type of input. For example, the client computing device 10A can be equipped with a keyboard to receive typed input, and/or a mouse (or one or more hardware buttons) to receive a user click that selects one or more graphical user interface (GUI) elements that is rendered visually at a user interface of the client computing device 10A. Additionally, or alternatively, the client computing device 10A can be equipped with one or more microphones that capture audio data, such as audio data capturing spoken utterances of the user and/or other sounds in an environment of the client computing device 10A. Additionally, or alternatively, the client computing device 10A can be equipped with one or more vision components that are configured to capture vision data corresponding to images and/or movements (e.g., gestures) detected within a field of view of one or more of the vision components. Additionally, or alternatively, the client computing device 10A can be equipped with one or more touch sensitive components (e.g., a stylus, a touch screen, a touch panel, etc.) that are configured to capture signal(s) corresponding to touch input that is directed to the client computing device 10A.

In various implementations, the rendering engine 102 can be configured to provide content for audible and/or visual presentation to a user of the client computing device 10A (or other client computing device) using one or more user interface output devices (e.g., display, speaker, etc.). For example, the client computing device 10A can be equipped with one or more speakers that enable content (e.g., "you have an alert message") to be provided for audible presentation to a user of the client computing device 10A. Additionally, or alternatively, the client computing device 10A can be equipped with a display or projector that enables content (e.g., "invocation stage needs to be checked for chatbot A installed at smart TV B") to be provided for visual presentation to the user via the client computing device 10. In some implementations, the data storage 106 can store various types of files and/or data. For instance, the data storage 106 of the client computing device 10A can store metadata (e.g., a user profile of user R, etc.) associated with the one or more applications and/or associated with the client computing device 10A.

In various implementations, the LLM-based assistant 104 can be configured for human-to-computer interaction (e.g., to carry out human-to-computer dialogs), and can further include local components such as an automatic speech recognition (ASR) engine 141 and/or a text-to-speech (TTS) engine 143. Additionally or alternatively, the plurality of local components of the LLM-based assistant 104 can include other component(s) such as a prompt-generating engine 145, and/or an LLM engine 147. It is noted that, in some implementations, the user input engine 101, the rendering engine 102, the ASR engine 141, the TTS engine 143, the prompt-generating engine 145, and/or the LLM engine 147 do not necessarily need to be all included in the LLM-based assistant 104. For instance, the user input engine 101 and/or the rendering engine 102 can be included in the client computing device 10A and be shared across one or more of the applications that are installed at (or accessible via) the client computing device 10A. As another example, the ASR engine 141, the TTS engine 143, the prompt-generating engine 145, and/or the LLM engine 147 can each additionally (or alternatively) have a corresponding cloud-based counterpart that is located at, or accessible via, a server (e.g., the server computing device 12 or other server(s)).

In some implementations, a user (e.g., user R) of the client computing device 10A may have a registered account associated with the LLM-based assistant 104 and/or other application(s). The other applications can include, for example, a social media application, a video player, a note-taking application, a shopping application, a messaging application, and/or any other appropriate applications (or services), installed at, or accessible via, the client computing device 10A.

In various implementations, the ASR engine 141 can process, using one or more streaming ASR models (e.g., a recurrent neural network (RNN) model, a transformer model, and/or any other type of ML model capable of performing ASR), streams of audio data that capture spoken utterances, to generate corresponding streams of ASR output. The ML model(s) can be on-device ML models that are stored locally at the client computing device 10A, remote ML models that are executed remotely from the server computing device (e.g., at remote server device 12), or shared ML models that are accessible to the client computing device(s) (e.g., 10A,10B, . . . , and/or 10N) and/or remote systems (e.g., the remote server computing device 12). The audio data can be acquired from audio recordings or can be generated by microphone(s) of the client computing device 10A. Notably, the streaming ASR model can be utilized to generate the corresponding streams of ASR output as the streams of audio data are generated.

In some implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 141 can select one or more of the ASR hypotheses as corresponding recognized text ("transcript") that corresponds to the spoken utterance(s) (e.g., selected based on the corresponding predicted measures).

In various implementations, the TTS engine 143 can process, using TTS model(s), corresponding streams of textual content (e.g., content generated based on LLM or a predetermined text, etc.), to generate synthesized speech audio data that includes computer-generated synthesized speech. In additional or alternative implementations, the synthesized speech audio data can be pre-cached in memory or in one or more databases accessible by the client computing device 10A.

In various implementations, the prompt-generating engine 145 of the client computing device 10A can be configured to generate a prompt (e.g., textual prompt) to be processed as input by the LLM engine 147, using a respective generative model from one or more generative models 190. In some implementations, the prompt-generating engine 145 can be included in the LLM engine 147.

In various implementations, the LLM engine 147 can be in communication with one or more of the generative models 190, for a prompt to be processed using one of the generative model(s) 190. In some implementations, the LLM engine 147 can include an embedding generation engine (not illustrated), where the embedding generation engine generates an input embedding (sometimes referred to as "input representation", "content embedding", "content representation" etc.) that encodes word content of a user input (e.g., user query/request/command) and a positional embedding that encodes relative positions between words or tokens in the user input. A "token" refers to a unit of text data for processing using one of the generative model(s) 190, and can correspond to a word, one or more characters of a word. In some implementations, a token can include not only character(s) but also punctuation(s), space(s), and/or emojis.

As a non-limiting example, a user input of "who's that" can be tokenized into a plurality of tokens, including a first token of "who", a second token of "'s", and a third token of "that". In this example, the input embedding that encodes the word content of the user input of "who's that" can be generated based on the plurality of tokens. In some implementations, the input embedding can be an N-dimensional numerical vector (e.g., [0.0012567 . . . , −0.2368598 . . , . . . , . . . ]) storing a total number of N floating point numbers, where N can be in the order of hundreds, thousands, etc. The N-dimensional numerical vectors can be a token representation of the plurality of tokens, in a latent space, that corresponds to the word content of the user input. In this example, a positional embedding can be generated based on relative positions of the tokens in the plurality of tokens, so as to encode/reflect the relative positions between the tokens in the user input. The positional embedding can also be configured in the form of an N-dimensional numerical vector storing a sequence of floating point numbers, so that the positional embedding can be combined with the input embedding, for processing using one of the generative model(s) 190.

In various implementations, the one or more generative models 190 can include a large language model (LLM) having less than 100 billion parameters, more than 100 billion parameters, or over 200 billion parameters, etc. The greater the number of parameters of an LLM, the more complex (or sophisticated) a task (e.g., specified in a user query or request) the LLM can handle. The LLM may be stored at client computing device 10A (or other client computing device(s), e.g., 10N), or at the server computing device 12. For instance, if the memory of the client computing device 10A restricts the storing of the LLM at the client computing device 10A or if a length of a textual prompt to be processed using the LLM exceeds a predetermined token length, the LLM may be stored at the server device 12. For instance, if the memory of the client computing device 10A does not restrict the storing of the LLM at the client computing device 10A, the LLM may be stored at the client computing device 10A, to reduce a latency in completing a task (e.g., specified in the user query or request), for instance, by avoiding data communications via the one or more networks 13.

In some implementations, when one of the generative model(s) 190 (e.g., an LLM) is stored at the client computing device 10A, the maximum token length of content (e.g., text) processable using the LLM may be a first maximum token length (e.g., 10,000). In some implementations, when the LLM is stored at the server device 12, the maximum token length of content (e.g., text) processable using the generative model 190 may be a second maximum token length (e.g., 30,000) that is greater than the first maximum token length. The maximum token length can be a maximum number of tokens (which can be parsed from a user input) that is allowed for processing, in a single iteration, using the LLM.

In some implementations, the LLM can be transformer-based. One non-limiting example of an LLM is GOOGLE'S Pathways Language Model (PaLM). Another non-limiting example of an LLM is GOOGLE'S Language Model for Dialogue Applications (LaMDA).

It is noted that, while the ASR engine 141, the TTS engine 143, the prompt-generating engine 145, and/or the LLM engine 147 are illustrated in FIG. 1A as being included as local components forming the LLM-based assistant 104. One or more of the ASR engine 141, the TTS engine 143, the prompt-generating engine 145, and/or the LLM engine 147 can have a counterpart at the server computing device 12 and/or other server computing devices. The present disclosure is not intended to be limiting.

In various implementations, additionally, or alternatively, the client computing device 10B (which can be the same as or different from the client computing device 10A) can include an NLU-based assistant 105 configured for human-to-computer interactions. The NLU-based assistant 105 can include, for instance, a user input engine 101B, a rendering engine 102B, an ASR engine 151, an TTS engine 153, a natural language processing (NLU) engine 155, and/or a fulfillment engine 157. The user input engine 101B can be the same as, or similar to, the user input engine 101. The rendering engine 102B can be the same as, or similar to, the rendering engine 102. The ASR engine 151 can be the same as, or similar to, the ASR engine 141. The TTS engine 153 can be the same as, or similar to, the TTS engine 143. Repeated descriptions for the user input engine 101B, the rendering engine 102B, the ASR engine 151, and the TTS engine 153 are omitted herein for the sake of brevity.

In various implementations, the NLU engine 155 can determine semantic meaning(s) of audio (e.g., the aforementioned audio data capturing the spoken utterance) and/or a text (e.g., natural language content from a message or the aforementioned speech recognition that is converted by the ASR engine 151 from the audio data), and decompose the determined semantic meaning(s) to determine intent(s) and/or parameter(s) for an assistant action. For instance, the NLU engine 155 can process natural language content of "Weather today in Louisville?", to determine a natural language understanding (NLU) intent (e.g., Internet search) and/or parameters (e.g., search parameters including: "weather", "today", and "Louisville", or "Weather today in Louisville?") for an assistant action (e.g., search the Internet for the weather in Louisville today).

In some implementations, the NLU engine 155 can resolve the intent(s) and/or parameter(s) based on a single utterance of a user (e.g., user R) and, in other situations, user-facing prompts can be generated based on unresolved intent(s) and/or parameter(s). In this latter situation, the generated user-facing prompts can be rendered to the user to receive user response(s), where the user response(s) to the rendered user-facing prompt(s) can be utilized by the NLU engine 155 in resolving intent(s) and/or parameter(s). Optionally, the NLU engine 155 can work in concert with a dialog file manager engine (not illustrated) that determines unresolved intent(s) and/or parameter(s). For instance, the dialog file manager engine can be alternatively or additionally utilized to generate the aforementioned prompt(s). In some implementations, the NLU engine 155 can utilize one or more NLU machine learning models in determining intent(s) and/or parameter(s).

In various implementations, the fulfillment engine 157 can receive an intent and/or parameter(s) of the intent, to fulfill the intent by performing a corresponding assistant action. As a non-limiting example, the fulfillment engine 157 can receive the aforementioned intent of Internet search and the aforementioned search parameter of "Weather today in Louisville?", to cause a search engine of the client device 10B to search the Internet for "Weather today in Louisville?". In this example, the fulfillment engine 157 can fulfill the intent by: (1) causing the search engine to search the Internet for the user query, i.e., "Weather today in Louisville?"), (2) generating fulfillment information (e.g., "it's cloudy outside, with a temperature of 26° C."), based on a search result (e.g., "Louisville, KY, Monday 11:00 am, cloudy, 26° C.") of the search, and/or (3) rendering the fulfillment information to the user of the computing device 10B. As another non-limiting example, the fulfillment engine 157 can receive an intent and/or parameter(s) for an assistant action that causes a thermostat in the living room to set room temperature at 72 F. In this example, the fulfillment engine 157 can fulfill the intent by generating and forwarding a control signal to the thermostat in the living room, where the control signal causes the thermostat to set the room temperature at 72 F.

Optionally, when the NLU engine 155 cannot resolve the intent(s) and/or cannot determine all parameter(s) for the intent(s), to fulfill an assistant action, the fulfillment engine 157 can generate a default response, such as "Sorry, I don't understand. Please try again." In this case, the default response can be customized based on functions or a type of the NLU-based assistant 155.

It is noted that, while the ASR engine 151, the TTS engine 153, the NLU engine 155, and/or the fulfillment engine 157 are illustrated in FIG. 1A as being included as local components forming the NLU-based assistant 105. One or more of the ASR engine 151, the TTS engine 153, the NLU engine 155, and/or the fulfillment engine 157 can have a counterpart at the server computing device 12 and/or other server computing devices. The present disclosure is not intended to be limiting.

In some implementations, additionally, or alternatively, the LLM-based assistant 104 of the client computing device 10A can include the NLU engine 155. But this is not required. In some implementations, the client computing device 10B can include the LLM-based assistant 104, the NLU-based assistant 105, and/or an assistant or chatbot having components and/or a version different from the LLM-based assistant 104/the NLU-based assistant 105. In other words, different client computing devices can be installed with different versions and/or types of chatbots/intelligent assistants, to enable human-to-computer interactions. The variance in the types and/or versions of the chatbots/intelligent assistants for human-to-computer interactions makes it difficult to apply existing metrics for evaluating performances (e.g., surface misbehavior) of different versions of an assistant or different models of assistants. The disclosed metrics for evaluating assistant performances not only determine reliability (e.g., surface reliability) of an interactive assistant application (e.g., LLM-based or NLU-based assistant), but also identify or classify specific causes of misbehaviors for the interactive assistant application accessible via different client computing devices.

In other words, the metrics disclosed herein can be universally applicable to evaluate and/or track performance (e.g., surface reliability) of different interactive software applications. The metrics disclosed herein additionally, or alternatively, identify or classify stage(s) where a given assistant misbehaves, and alert staff to fix issues based on the identified or classified stage(s).

In various implementations, the server computing device 12 can include an assistant evaluation system 120 that includes a query collection engine 121, a metrics determination engine 123, an assistant evaluation engine 125, a data storage 126, and/or an alert engine 127. The server computing device 12 can be, for example, a web server, one or more blade servers acting together to provide "cloud" infrastructure, or any other type of server as needed. In some implementations, the assistant evaluation engine 125 can be configured to evaluate a surface infrastructure of an assistant for user interaction, where the assistant for user interaction can be the LLM-based assistant 104, the NLU-based assistant 105, or other types of assistant/chatbot used for user interaction.

The "surface infrastructure" herein may include one or more components of the assistant for user interactions that interfaces with a user, which are configured to receive user input, communicate with additional component(s) that interprets and/or understands the received user input, communicate with further component(s) that determine a response (e.g., responsive content or action) for the received user input, render a user interface to display the determined response, and/or execute the determined action in response to the received user input. In some implementations, the "surface infrastructure" herein may exclude the additional component(s) (e.g., NLU engine and/or NLU model) that interprets and/or understands the received user input, and may exclude the further component(s) that determine a response (e.g., responsive content or action) for the received user input. For example, the surface infrastructure can exclude the generative model(s) 190 (as shown in FIG. 1A) that are utilized to determine response(s) for user input(s), ASR models for recognizing a spoken utterance, NLU models for determining an intent of a user (and/or associated parameters) from a user input of the user.

As a working example, given an identified assistant (e.g., the LLM-based assistant 104) that is to be evaluated (and/or a particular device, or a particular type of devices, at which the identified assistant is installed, the query collection engine 121 can receive (or collect) a plurality of user queries received, processed, and/or responded via the identified assistant. Additionally, or alternatively, the query collection engine 121 can receive (or collect) metadata associated with the plurality of user queries. The metadata of a specific user query, for instance, can indicate whether the identified assistant is invoked to respond to the specific user query, and/or how long it takes to invoke the identified assistant. As another example, the metadata of a specific user query can indicate whether the identified assistant causes a response to a specific user query to be rendered and/or how long the identified assistant causes a response to be rendered. Descriptions of the metadata can be found in more detail later in this disclosure. In some implementations, the plurality of user queries and/or the associated metadata can be received, for instance, from one or more of the client computing devices (e.g., 10A and other client computing device(s) that are installed with an assistant the same as the LLM-based assistant 104). In some implementations, the plurality of user queries and/or the associated metadata can be received from a particular client computing device (e.g., vehicle, smart TV, etc.), or a particular type of client computing device (e.g., manufactured by the same manufacturer). Optionally, the query collection engine 121 can store (e.g., temporally) the plurality of user queries (and/or associated metadata) in the data storage 126.

Continuing with the working example above, the metrics determination engine 123 can automatically process the plurality of user queries to evaluate a performance (e.g., surface reliability) of the identified assistant. For instance, the metrics determination engine 123 can be configured to periodically process a set of user queries received by the identified assistant during a corresponding time period, to evaluate a performance of the identified assistant during the corresponding specific time period. In some implementations, additionally, or alternatively, the query collection engine 121 can collect or retrieve, in response to receiving a user request that specifies a particular assistant to be evaluated (e.g., in or not in association with a particular surface (auto, smart TV, wearable device, etc.), a set of user queries (with associated metadata) that handled by the particular assistant (e.g., at the particular surface, but this is not required) during a period of time (e.g., a default period such as one week, or a user-specified period from the user request) preceding a moment at which the user request is received. Optionally, the user request can additionally specify a particular surface (e.g., auto) at which performance of the particular assistant is to be evaluated. In this case, the query collection engine 121 can collect or retrieve user queries that were handled by the particular assistant at the particular surface (auto, smart TV, wearable devices, etc., which can be manufactured by third parties).

The query collection engine 121 can forward the set of user queries (collected or retrieved responsive to the user request) and/or associated metadata, to the metrics determination engine 123. Such forwarding can trigger the metrics determination engine 123 to process the set of user queries (collected or retrieved responsive to the user request), for instance, to generate one or more processing results (e.g., one or more evaluation scores, and/or classification labels, etc.). The one or more evaluation scores can include, for instance, a surface response rate described later in this disclosure).

The assistant evaluation engine 125 can, based on the one or more processing results (e.g., one or more evaluation scores, and/or labels, etc.), determine whether the identified assistant (or surface infrastructure thereof) is reliable or not. Alternatively or additionally, the assistant evaluation engine 125 can determine which part or stage of the identified assistant malfunctions or misbehaves. In some implementations, in response to the assistant evaluation engine 125 determining that a specific stage of the identified assistant has encountered misbehavior, the alert engine 127 can generate an alert message and/or cause the alert message to be delivered.

The alert message, for instance, can identify the specific stage at which the identified assistant misbehaves, and/or identify researchers or employees (and/or their contact information such as email address, etc.). The alert message, for instance, can be delivered to the associated employees or researchers as a text message, an email message, a shared report, or any other applicable format. The present disclosure is not intended to be limiting.

Figure 1B:
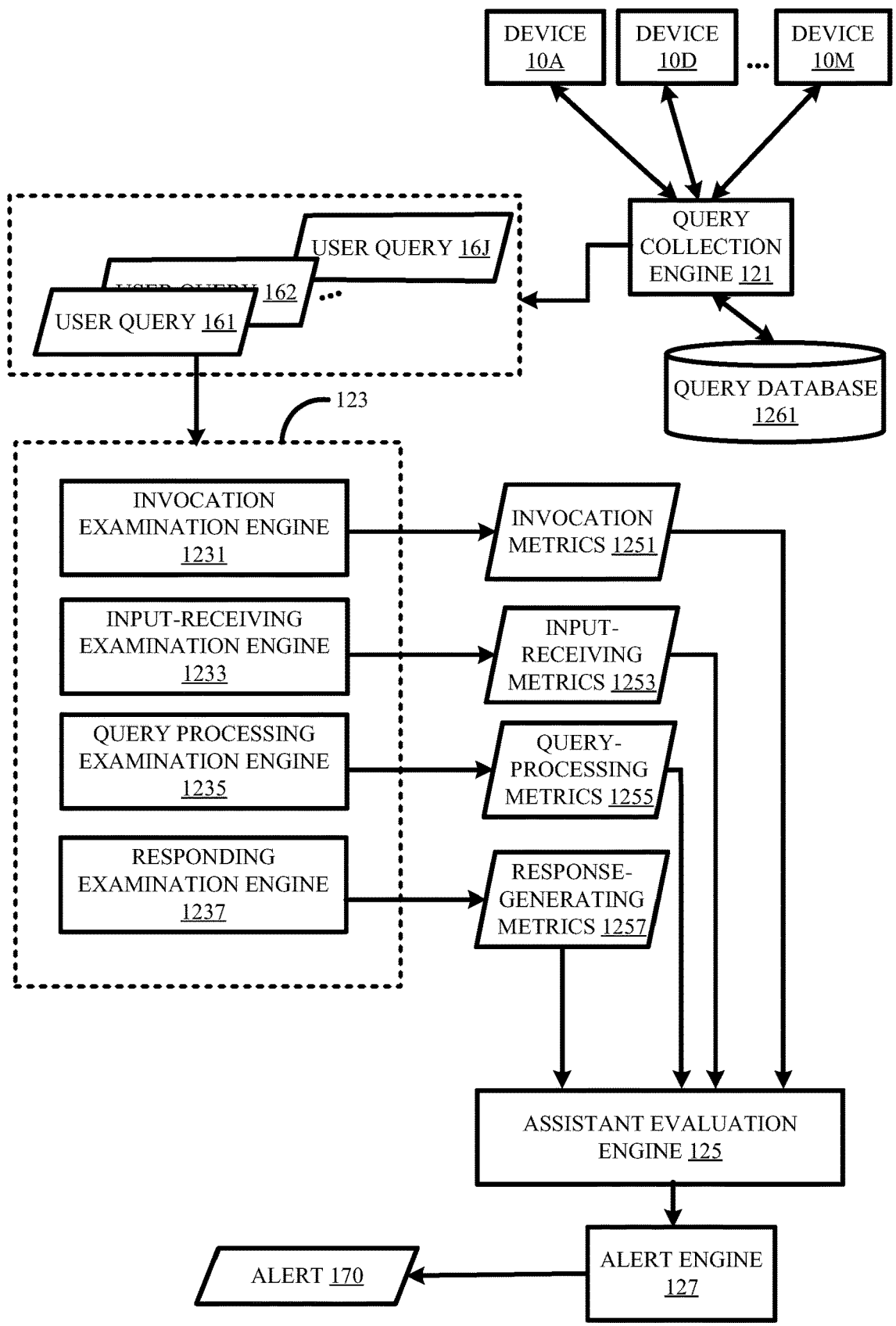
FIG. 1B illustrates a working scenario where an assistant is evaluated using an example assistant evaluation system, in accordance with various implementations disclosed herein.

FIG. 1B illustrates a working scenario where an assistant (also referred to as "chatbot', etc.) is evaluated using an example assistant evaluation system, in accordance with various implementations disclosed herein. As shown in FIG. 1B, a query collection engine 121 of an assistant evaluation system (e.g., 120 in FIG. 1A) can be configured to collect a plurality of user queries (e.g., 161, 162, . . . , 16J, where J is a positive integer greater than or equal to "1") directed to a particular assistant (e.g., assistant A), and/or metadata associated with the plurality of user queries (e.g., 161, 162, . . . , 16J). In some implementations, the plurality of user queries 161, 162, . . . , 16J can be collected in response to a user request to evaluate assistant A. In some other implementations, the plurality of user queries can be collected automatically and/or periodically. In some implementations, the user queries 161, 162, . . . , 16J can be collected by the query collection engine 121 from one or more devices (e.g., 10A, 10D, . . . , 10M), where the one or more devices can include different devices installed with assistant A, or can include devices that are of the same type/model and that have the assistant A installed.

For instance, in response to receiving a user request (e.g., "check performance of assistant A since the update last Thursday"), the query collection engine 121 can send a query-retrieving request to each of the plurality of devices (e.g., 10A, 10D, . . . , 10M) that has assistant A installed and updated, but not to device(s) (e.g., 10N) for which assistant A is not installed or for which assistant A has not been updated. The query-retrieving request can identify one or more conditions, to retrieve user queries that satisfy the one or more conditions (e.g., queries that are directed to the updated assistant A and that have been received since last Thursday). The one or more conditions can include one or more user-specified conditions (e.g., a particular assistant, a particular surface, a particular period of time, etc.) derived from the user request and/or one or more default conditions. The one or more default conditions can include, for instance, a first default condition that specifies a total number of user queries that need to be retrieved for performance evaluation. Additionally or alternatively, the one or more default conditions can include, for instance, a second default condition that specifies a total number of different devices that user queries need to be retrieved from. Additionally or alternatively, the one or more default conditions can include, for instance, a third default condition that specifies a temporal window/period (e.g., past week, past month) during which the user queries are received and/or processed at respective client device(s).

In some implementations, one or more of the default conditions (e.g., past week) can be modified based on the user request, to be consistent with user-specified conditions (e.g., replace a default period of "one week" with "since last Thursday") that are present in, or indicated by, the user request. Descriptions of the user-specified conditions and/or the default conditions, however, are not limited herein. For instance, the one or more default conditions can, additionally or alternatively, include a fourth default condition that filters duplicated/repeated user queries from the plurality of user queries collected by the query collection engine 121 to evaluate an assistant (e.g., assistant A) for user interaction. As another example, the one or more default conditions can, additionally or alternatively, include a fifth default condition that filters any user query that has been canceled by a human user before a response (to the user query) is rendered, from the plurality of user queries that are collected by the query collection engine 121 to evaluate the assistant (e.g., assistant A).

In some implementations, the query collection engine 121 can send a query-retrieving request to a query database 1261, to retrieve user queries based on the user request and/or the one or more default conditions. The query database 1261 can be, but does not necessarily need to be, included in the data storage 126. The query database 1261 can include, for instance, a plurality of query entries, where each query entry includes a device identifier identifying an assistant (and/or a device hosting the assistant) to which a user query is directed, the user query, and/or metadata associated with the user query. The metadata associated with the user query can include, for instance, invocation metadata indicating whether the assistant is invoked in response to the user query (or in response to a triggering hotword (shortly as "hotword") such as "Hey, Assistant"). The invocation metadata can indicate, for instance, that the assistant is not triggered (e.g., from a passively listening state to an actively listening state) or does not open even after a hotword model acknowledges receiving/recognizing the triggering hotword. In the passively listening state, the assistant may be configured to monitor only one or more pre-configured triggering hotwords and ignore other user signals/input. In the actively listening state, the assistant may be configured to monitor all types of user input content including, or in addition to, the pre-configured triggering hotwords.

The metadata associated with the user query can further include, for instance, input metadata indicating whether audio data capturing a spoken utterance is recorded, truncated, or missed (completely or partially). For instance, the input metadata can indicate a starting time of audio recording of the audio data capturing the spoken utterance and/or an ending time of the audio recording that records the audio data capturing the spoken utterance. Additionally, or alternatively, the input metadata associated with the user query can indicate whether and/or when a transcript of the spoken utterance is rendered via a user interface of the assistant. In some implementations, the input metadata may, but does not necessarily need to include the transcript/speech recognition of the spoken utterance recognized using an ASR model and/or an ending moment when a user finished speaking (as detected using the ASR model). For example, in some implementations, the input metadata can exclude the speech recognition of the spoken utterance recognized using an ASR model and/or exclude the ending moment when a user finished speaking (as detected using the ASR model).

In some implementations, the input metadata associated with the user query can indicate whether there is a misbehavior of an input device (e.g., microphone). For instance, in some situations where it takes a period longer than a predefined period for a microphone to open, a user speech such as "How is the weather" may not be captured, resulting in no response to the user query. In this case, the input metadata associated with the user query can indicate that the microphone does not open within the predefined period, resulting in a failure for the surface infrastructure (e.g., components for invocation phase/stage) of the assistant.

The metadata associated with the user query can further include, for instance, processing metadata indicating whether the transcript of the spoken utterance is fetched/received by the Assistant (e.g., the NLU model or LLM thereof). In some implementations, the processing metadata associated with the user query can, but does not necessarily need to include (and can even exclude), content of a response generated for the spoken utterance (e.g., using the NLU model and/or LLM(s)). For instance, the processing metadata may or may not indicate whether the generated response is satisfactory or not.

The metadata associated with the user query can further include, for instance, responding metadata indicating whether the generated response is executed or rendered. For instance, the responding metadata can indicate whether an action is completed/executed by the assistant in response to the user query. For instance, the user query may be "navigate home", and the assistant may respond with an audible response such as "opening the Maps", but fail to launch the "Maps" application. In this case, the action of "opening the Maps application" may not be appropriately executed, or the "Maps" application may encounter a startup failure. The responding metadata can indicate a failure in a rendering/responding stage of the surface infrastructure of the assistant.

Descriptions of the metadata, however, are limited herein. Additional or alternative implementations of the metadata (e.g., invocation metadata, input metadata, processing metadata, responding metadata) and processing thereof can be found elsewhere in this disclosure, which is not intended to be limiting.

Referring again to FIG. 1B, after collecting the plurality of user queries (161, 162, . . . , 16J), the query collection engine 121 can forward the plurality of user queries (161, 162, . . . , 16J) to a metrics determination engine 123. In some implementations, as shown in FIG. 1B, the metrics determination engine 123 can include an invocation examination engine 1231, an input-receiving examination engine 1233, a query processing examination engine 1235, and/or a responding examination engine 1237. Each of the plurality of user queries (161, 162, . . . , 16J) can be processed using one or more engines (1231, 1233, 1235, and/or 1237) from the metrics determination engine 123, to determine one or more metrics for the respective user query.

For example, the user query 161 can be retrieved by the query collection engine 121 based on such user query 161 being received by updated assistant A at a client device (e.g., 10D) last Saturday, and thus satisfying the user-specified conditions from the user request. As a non-limiting example, the user query 161 can be an audible user input of "take me home" received by the updated assistant A last Saturday. Such audible user input may have, for instance, incorrectly triggered a search application to perform a search for content responsive to "take me home" last Saturday, instead of triggering a navigation application to navigate a user from a current location to a home address. Such user query 161 can be forwarded to the metrics determination engine 123 and be processed using the invocation examination engine 1231, to generate one or more invocation metrics 1251 for the user query 161.

In some implementations, the one or more invocation metrics 1251 for the user query 161 can include a first label (e.g., a "Good" label) assigned to an invocation stage of the assistant if a GUI element representing the assistant is rendered within a predefined invocation period of time (e.g., 3 seconds) via a graphical user interface (GUI) of the assistant. Additionally, or alternatively, the one or more invocation metrics 1251 for the user query 161 can include an invocation latency in rendering the GUI element that represents the assistant. In some other implementations, the one or more invocation metrics 1251 for the user query 161 can include a label "Good" assigned to an invocation stage of the assistant for a greeting sound representing invocation of the assistant being rendered audibly within the predefined invocation period of time via an audible user interface of a speaker of a device that is installed with the assistant. Additionally, or alternatively, the one or more invocation metrics 1251 for the user query 161 can include an invocation latency in rendering the greeting sound from the assistant.

In response to the one or more invocation metrics 1251 for the user query 161 indicating that the assistant is invoked (e.g., based on the label "Good" or based on the invocation latency being within the predefined invocation period of time), the user query 161 and/or metadata associated thereof can be provided to the input-receiving examination engine 1233. For instance, the input-receiving examination engine 1233 can process the metadata associated with the user query 161, to generate one or more input-receiving metrics 1253. The one or more input-receiving metrics 1253 can include, for instance, a "Good" label assigned by the input-receiving examination engine 1233 to the assistant based on, for instance, one or more input-receiving conditions being satisfied. The sequence of input-receiving conditions can include, for instance, a microphone being opened within a predefined input-receiving period (e.g., 4 seconds) since detection of a hotword that triggers the assistant. The one or more input-receiving conditions can include, additionally or alternatively, audio recording of a spoken utterance that contains the user query 161 finishes successfully without user interruption/cancellation. In some implementations, in response to determining that audio recording of the user query 161 (e.g., in the form of a spoken utterance) is interrupted by a user, evaluation of the user query 161 can be paused and the user query 161 can be assigned an "ineligible" label, be filtered out, and no longer be included in evaluating the surface infrastructure of the assistant.

In response to the one or more input-receiving metrics 1253 for the user query 161 indicating that an input (e.g., a speech recognition of the user query 161) to the assistant was received by the assistant successfully (e.g., based on the label "Good" or based on an latency for the input to be arrived at the assistant) within the predefined input-receiving period of time, the user query 161 and/or metadata associated thereof can be provided to the query processing examination engine 1235. For instance, the query processing examination engine 1235 can process the metadata associated with the user query 161, to generate one or more query processing metrics 1255. The one or more query processing metrics 1255 can include, for instance, a "Good" label assigned by the query processing examination engine 1235 to the assistant based on, for instance, one or more query processing conditions being satisfied.

In some implementations, in response to the one or more query processing metrics 1255 for the user query 161 indicating that a response is generated for the user query 161 within a predefined query-processing period of time, the user query 161 and/or metadata associated thereof can be provided to the responding examination engine 1237. For instance, the responding examination engine 1237 can process the metadata associated with the user query 161, to generate one or more response-receiving metrics 1257. The one or more response-receiving metrics 1257 can include, for instance, a "Good" label assigned by the responding examination engine 1237 to the assistant based on, for instance, one or more response-receiving conditions being satisfied.

In some implementations, the assistant evaluation engine 125 can determine whether the user query 161 needs to be excluded for evaluating the assistant based on the one or more invocation metrics 1251, the one or more input-receiving metrics 1253, the one or more query processing metrics 1255, and the one or more response-receiving metrics 1257. For example, if any of the one or more invocation metrics 1251, the one or more input-receiving metrics 1253, the one or more query processing metrics 1255, and the one or more response-receiving metrics 1257, includes an "ineligible" label, the user query 161 needs to be excluded from evaluating the assistant. Additionally, if any of the one or more invocation metrics 1251, the one or more input-receiving metrics 1253, the one or more query processing metrics 1255, and the one or more response-receiving metrics 1257, includes an "unknown" label or a sub-label such as "unknown—CANNOT_COMPUTE_LATENCY" (e.g., indicating that the metadata for the user query 161 is incomplete, malformed, or is missing information relating to invocation, input, processing, and/or responding), the user query 161 needs to be excluded.

In some implementations, after excluding the user query 161 from evaluating the assistant, processing of the one or more user queries (161, 162, . . . , 16J) can continue to processing of the user query 162. In some implementations, processing of the user queries can be performed in parallel (e.g., approximately the same time). In some implementations, the order of processing user queries from the one or more user queries (161, 162, . . . , 16J) is not limited to descriptions herein.

In some implementations, based on processing of the one or more user queries (161, 162, . . . , 16J), the assistant evaluation engine 125 can filter out a subset of user queries from the user queries (161, 162, . . . , 16J) that have been respectively assigned one or more "ineligible" label and/or one or more "unknown" label, to acquire a filtered set of user queries. The assistant evaluation engine 125 can determine reliability (e.g., surface reliability) of the assistant based on the filtered set of user queries.

In some implementations, the assistant evaluation engine 125 can determine a first amount (e.g., $N_g$) of user queries assigned with a "Good" label for each of an invocation stage, an input-receiving stage, a response-receiving stage, and a response-rendering stage based on the one or more invocation metrics 1251, the one or more input-receiving metrics 1253, the one or more query processing metrics 1255, and the one or more response-rendering metrics 1257. The assistant evaluation engine 125 can further determine a total number $N_t$ of user queries present in the filtered set of user queries. In some implementations, the assistant evaluation engine 125 can determine whether the assistant is reliable based on a value (e.g., in the form of percentage) of $N_g/N_t$. For instance, in response to the percentage of $N_g/N_t$ satisfying (e.g., exceeding) a predefined reliability threshold (e.g., a predefined reliability percentage of 88%), the assistant evaluation engine 125 can determine that the assistant is reliable. In response to the percentage of $N_g/N_t$ not satisfying the predefined reliability threshold, the assistant evaluation engine 125 can determine that the assistant is not reliable.

In some implementations, the assistant evaluation engine 125 can identify surface misbehaviors associated with one or more stages of the assistant. For instance, the assistant evaluation engine 125 can determine a percentage of "bad" labels for each stage associated with the assistant, and if a percentage of "bad" labels for a specific stage (e.g., invocation stage, input-receiving stage, query processing stage, or response-rendering stage satisfies (e.g., exceeds) a predefined stage failure threshold (e.g., 30%), the alert engine 127 can generate an alert message (e.g., alert 170). The alert engine 127 can cause the alert message to be delivered to staff responsible for monitoring or modifying the specific stage.

In some implementations, optionally, the assistant evaluation engine 125 can determine an invocation rate for assistant A, based on the one or more invocation metrics 1251 determined for each of the user queries (161, 162, . . . , 16J), or based on processing invocation metadata associated with each of the user queries (161, 162, . . . , 16J) using the invocation examination engine 1231. The assistant evaluation engine 125 can generate a low invocation rate alert for assistant A, and/or deliver the low invocation rate alert to a team of staff responsible for the invocation stage of assistant A, in response to the determined invocation rate not satisfying a predefined minimum invocation rate.

In some implementations, optionally, the assistant evaluation engine 125 can determine an speech detection/recognition rate for assistant A, based on the one or more input-receiving metrics 1253 determined for each of the user queries (161, 162, . . . , 16J), or based on processing input-receiving metadata associated with each of the user queries (161, 162, . . . , 16J) using the input-receiving examination engine 1231. The assistant evaluation engine 125 can generate a low input-receiving rate alert for assistant A, and/or deliver the low input-receiving rate alert to a team of staff responsible for the invocation stage of assistant A, in response to the determined input-receiving rate not satisfying a predefined minimum input-receiving rate.

In some implementations, optionally, the assistant evaluation engine 125 can determine a user-cancellation rate respectively for one or more of the invocation, input-receiving, query-processing, and/or responding stages of assistant A. The assistant evaluation engine 125 can generate one or more corresponding alerts alerting a particular high user-cancelation rate for one or more of the stages of assistant A.

By using the example assistant evaluation system disclosed herein, reliability of a surface infrastructure of an interactive software application ("assistant") can be determined, and/or specific stage(s) of the interactive software application that exhibits misbehavior(s) can be identified/alerted. The disclosed assistant evaluation system may be applicable to evaluate different interactive software applications, or can be applicable to a particular interactive software application that is updated now and then, with none or limited modifications.

Figure 2:
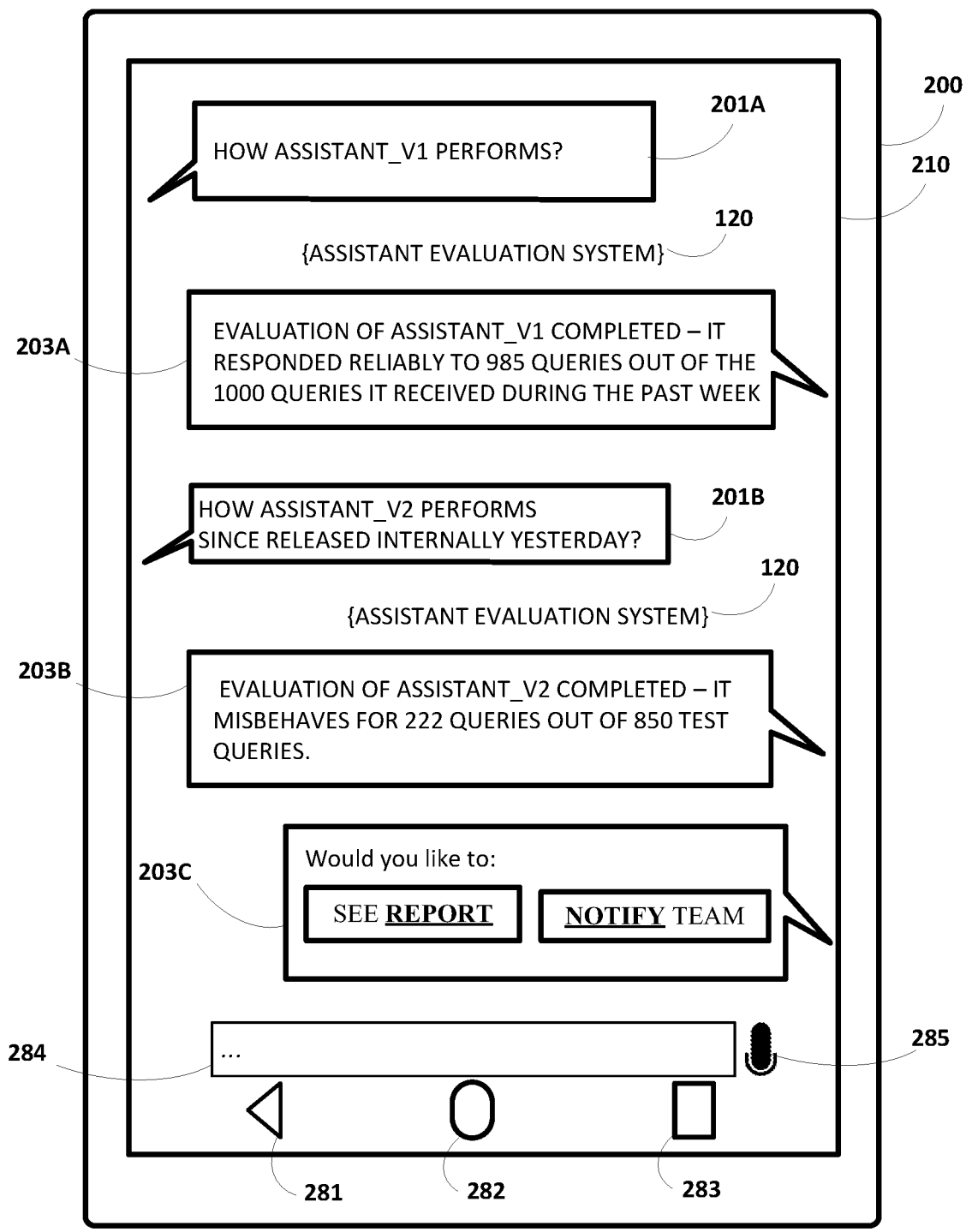
FIG. 2 depicts an example of performing evaluation of an assistant and/or rendering evaluation result(s), in accordance with various aspects of the present disclosure.

FIG. 2 depicts performing evaluation of an assistant and/or rendering evaluation result(s), in accordance with various aspects of the present disclosure. As shown in FIG. 2, a user (e.g., a manager) of a client device 200 can trigger an assistant evaluation system (e.g., 120 in FIG. 1A) via a user interface 210 of the assistant evaluation system. The assistant evaluation system can be launched or accessed, for instance, at a client device 200. The user can provide a typed input (or other types of input, such as an audible input) 201A to the assistant evaluation system via the user interface 210. The typed input 201A can be, for instance, "How Assistant_V1 performs?". In response to receiving the typed input 201A, the query collection engine 121 of the assistant evaluation system 120 can retrieve a plurality of user queries directed to an interactive software application identified as "Assistant_V1", where the plurality of user queries are retrieved based on satisfying one or more user-specified conditions in the typed input 201A and/or one or more default conditions. The one or more user-specified conditions and/or the one or more default conditions can be found elsewhere in this disclosure, and repeated descriptions are omitted herein for the sake of brevity.

In some implementations, the metrics determination engine 123 can process the plurality of user queries retrieved by the query collection engine 121 based on the typed input 201A, to determine one or more evaluation metrics. For instance, as described above, the one or more evaluation metrics can include one or more invocation metrics associated with an invocation stage of the interactive software application (e.g., "Assistant_V1"), one or more input-receiving metrics associated with an input-receiving stage of interactive software application (e.g., "Assistant_V1"), one or more query-processing metrics associated with a query-processing stage of the interactive software application (e.g., "Assistant_V1"), and/or one or more response-receiving metrics associated with a response-rendering stage of the interactive software application (e.g., "Assistant_V1"). In some implementations, each of the different types of metrics can include a corresponding label determined from a plurality of predefined labels, such as "Good", "Bad", "Ineligible" and "Unknown".

Based on the one or more evaluation metrics, the assistant evaluation engine 125 can determine reliability of the interactive software application (e.g., "Assistant_V1"), and/or generate an alert alerting a specific stage of the interactive software application (e.g., "Assistant_V1"). As a non-limiting example, referring to FIG. 2, the assistant evaluation engine 125 can determine that the interactive software application "Assistant_V1" is reliable. In this example, the alert engine 127 can generate a reporting message 203A and cause the reporting message 203A to be rendered at the user interface 210 as a response to the typed input 201A. The reporting message 203A can, for instance, notify the user that the interactive software application "Assistant_V1" is reliable, and can include content such as "Evaluation of Assistant_V1 is completed—it responded reliably to 985 queries out of the 1000 queries it received during the past week".

In some implementations, the interactive software application "Assistant_V1" may be subsequently updated and now have different components or access different models (e.g., different ASR models, LLM models, NLU models, etc.). In this case, the assistant evaluation system 120 can still be applied to evaluate a surface infrastructure of the updated interactive software application, e.g., "Assistant_V2". For example, further referring to FIG. 2, the user can trigger the assistant evaluation system by providing, for instance, an audible input, where a transcript 203A of the audible input (e.g., "How Assistant_V2 performs since released internally yesterday?") can be rendered at the user interface 210.

Continuing with the example above, the assistant evaluation system 120 can be triggered and a set of user queries satisfying conditions derived from the audible input can be retrieved and processed to determine reliability of the updated interactive software application "Assistant_V2". For instance, the assistant evaluation system 120 can output an alert message 203B in response to determining that the updated interactive software application "Assistant_V2" is not reliable. In some implementations, the alert message 203B can include statistical data indicating the reliability of the updated interactive software application "Assistant_V2". For example, as shown in FIG. 2, the alert message 203B can include content such as "Evaluation of Assistant_V2 completed—it misbehaves for 222 queries out of 850 test queries". In some other implementations, the alert message 203B can be conclusive and concise, including content such as "Assistant_V2 is determined 'Unreliable'". Additionally or alternatively, the assistant evaluation system 120 can further output a trouble-shooting message 203C, where the trouble-shooting message 203C can include one or more options for the user to dive into details of the misbehaviors of the updated interactive software application "Assistant_V2".

For example, the one or more options in the trouble-shooting message 203C can include a "report" option 2031 and/or a "notify" option 2033. The "report" option 2031 can be a selectable graphical user interface (GUI) element embedded with a first link (e.g., URL). Execution of the first link may cause the report detailing the evaluation of the updated interactive software application "Assistant_V2" by the assistant evaluation system 120 to be rendered, downloaded, etc. The report can be rendered as an overlay over or within the user interface 210, or can be downloaded from a server storing reports for the user of the assistant evaluation system 120, and the present disclosure is not intended to be limiting.

The "notify" option 2033 can be a selectable graphical user interface (GUI) element embedded with a second link (e.g., URL). The execution of the second link can cause the alert message 203B and/or the report to be delivered to a team responsible for maintaining a specific stage of the updated interactive software application "Assistant_V2" for which counts (or percentage, etc.) of misbehavior of the assistant triggers an upper limit.

In some implementations, the user interface 210 can include one or more additional user interface elements such as an input field 284 to receive typed input, a microphone icon 285 to receive audible user input, and/or additional elements 281, 283, and 283 to facilitate switching of different user interfaces, etc. The present disclosure is not limited thereto.

Figure 3A:
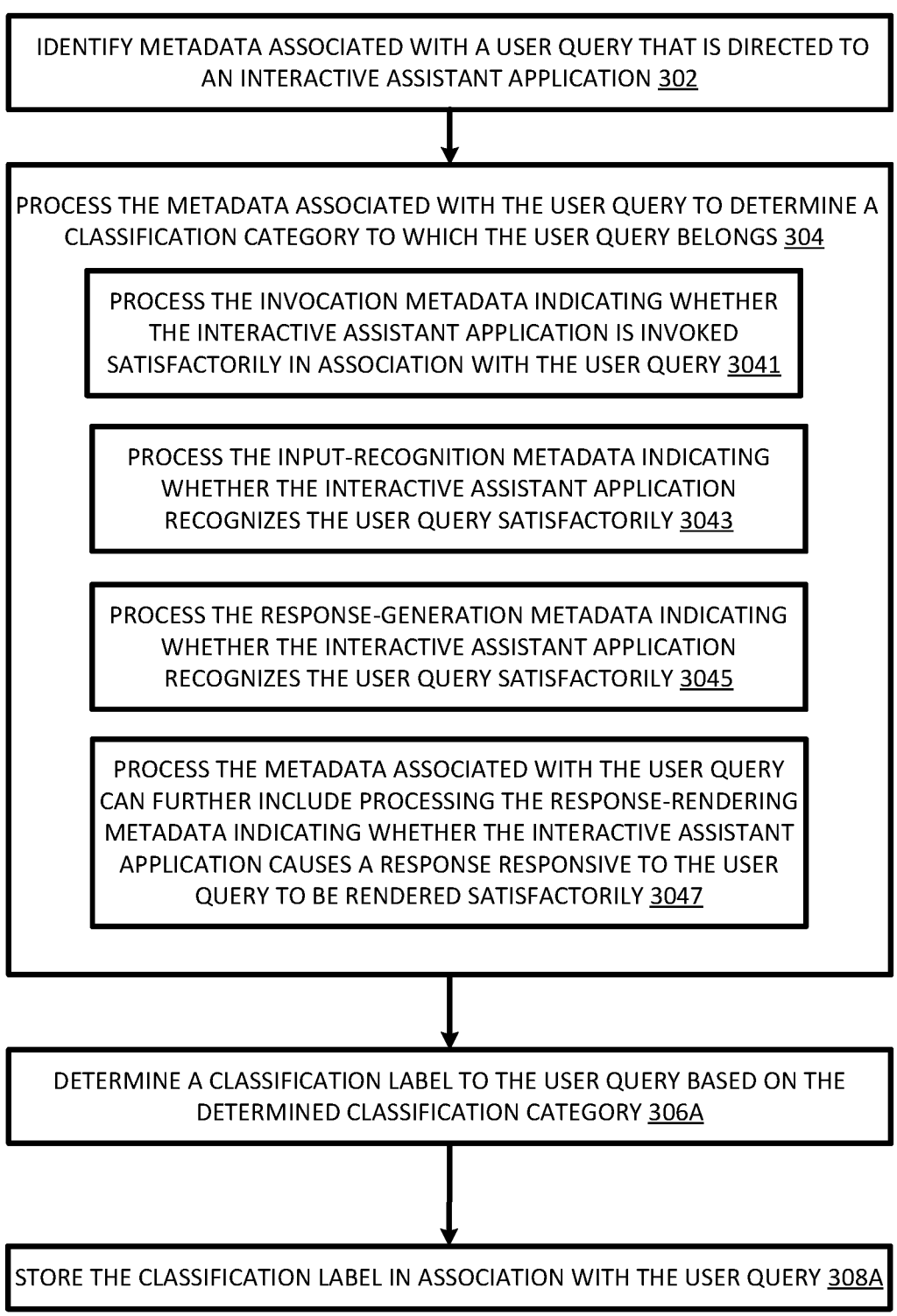
FIG. 3A depicts a flowchart illustrating an example method of evaluating a user query, in accordance with various aspects of the present disclosure.

Turning now to FIG. 3A, a flowchart illustrating an example scenario 300A of evaluating a user query is provided, in accordance with various aspects of the present disclosure. A system for performing the method 300A includes one or more processors, memory, and/or other component(s) of computing device(s) (e.g., client computing device 10A, . . . , or 10N of FIG. 1A, one or more servers such as 12 in FIG. 1A, and/or other computing devices). Moreover, while operations of the method 300A are shown in a particular order, this is not meant to be limiting. One or more operations may be reordered, omitted, and/or added.

In various implementations, at block 302, the system identifies metadata associated with a user query (or a user request) that is directed to an interactive assistant application. In various implementations, at block 304, the system processes the metadata associated with the user query to determine a classification category to which the user query belongs.

In some implementations, the user query (e.g., "what is the weather today") can be included in, or determined from, a spoken utterance (e.g., "Assistant, what is the weather today") received by microphone(s) of a client device that hosts the interactive assistant application. In some implementations, the spoken utterance can include a hotword (e.g., "Assistant") preceding the user query, where the hotword triggers or invokes the interactive assistant application. In some implementations, the interactive assistant application can include or access a hotword model (which, for instance, can be a machine learning "ML" model) that is configured to detect presence of one or more predefined hotwords (e.g., "Hey Assistant", "Assistant", etc.) from audio data, and the interactive assistant application can be (and sometimes only be) invoked in response to one of the one or more predefined hotwords being detected using the hotword model. In some implementations, optionally, the interactive assistant application can enter from a passive listening state (e.g., a state where only the hotword model is activated to monitor for any word or phrase that matches one of the one or more predefined hotwords) to an active listening state (e.g., a state where other assistant components such as ASR engine, NLU engine, TTS engine, fulfillment engine, and/or LLM engine, etc., are activated to recognize, understand, and/or respond to the user query in the spoken utterance). In some implementations, the interactive assistant application can be invoked in other manners, such as a click on a physical button (e.g., a mechanical button of a vehicle system) configured to trigger the interactive assistant application, or a tap on a selectable graphical user interface (GUI) element configured to trigger/invoke the interactive assistant application. The present disclosure is not intended to be limiting.

In some implementations, the user query (e.g., "what is the weather today") can be included in, or determined from, a typed user input (e.g., "what is the weather today") received via a user interface of the interactive assistant application installed at, or otherwise accessible via, the client device. Such typed user input can be received by the interactive assistant application after the interactive assistant application is invoked. In this case, the interactive assistant application can be invoked by launching and/or logging into the interactive assistant application, by selecting (e.g., clicking or tapping) the selectable GUI element configured to trigger/invoke the interactive assistant application, etc. It is noted that the selectable GUI element can be, but does not necessarily need to be rendered at a user interface of the client device. For instance, the selectable GUI element to invoke the interactive assistant application can be rendered at a user interface of a third-party application (e.g., a social media application, etc.) that is distinct and/or separate from the interactive assistant application.

In some implementations, the metadata associated with the user query, for instance, can be identified or retrieved from a file/document containing information that reflects activities or behavior(s) of the interactive assistant application towards the user query. In some implementations, the system identifies the metadata associated with the user query (or the user request) that is directed to an interactive assistant application automatically (i.e., without an instant human request) and/or periodically. In some other implementations, the system identifies the metadata associated with the user query (or the user request) in response to receiving a human input that requests evaluation or classification of the user query.

In some implementations, the metadata associated with the user query (which can be recorded in the aforementioned file) can include invocation metadata indicating whether the interactive assistant application is invoked satisfactorily in association with the user query. For instance, the invocation metadata can include a first time-stamp ($t_1$) indicating a receiving time of an invocation event (e.g., a tap on the aforementioned selectable GUI element, utterance of hotword, etc.) of the interactive assistant application. Additionally, or alternatively, the invocation metadata can include a second time-stamp ($t_2$) indicating an invocation time at which the interactive assistant application is invoked. In some implementations, the second time-stamp ($t_2$) can be a time at which a first invocation condition and/or a second invocation condition (different from the first invocation condition) are satisfied.

In some implementations, the first invocation condition can be satisfied in response to a GUI element (e.g., an icon or symbol, etc.) that represents the interactive assistant application being rendered at the client device, or can be satisfied in response a predefined sound (e.g., a beep) indicating that the interactive assistant application is invoked being rendered via the client device (or another device). The first invocation condition can be satisfied in response to other event(s) perceivable by a user of the client device to indicate that the interactive assistant application is invoked. In some implementations, the second invocation condition can be satisfied in response to one or more microphones of the client device being detected as open and/or the interactive assistant application is detected in the actively listening state at the time when the first invocation condition is satisfied.

In some implementations, processing the metadata associated with the user query includes processing the invocation metadata indicating whether the interactive assistant application is invoked satisfactorily in association with the user query (block 3041). In some implementations, processing the invocation metadata indicating whether the interactive assistant application is invoked satisfactorily in association with the user query can include: processing the invocation metadata associated with the user query to assign one of a plurality of predefined labels to an invocation stage of the interactive assistant application for the user query. The plurality of predefined labels can include, for instance, a first label (e.g., a "Good" label) indicating invocation of the interactive assistant application in response to the user query with a threshold of time for assistant invocation (shortly as "invocation threshold"). Additionally, or alternatively, the plurality of predefined labels can include, for instance, a second label (e.g., a "Bad" label) indicating invocation of the interactive assistant application in response to the user query beyond the invocation threshold, or indicating a failure of the interactive assistant application to invoke the interactive assistant application in response to the user query. Additionally, or alternatively, the plurality of predefined labels can include, for instance, a third label (e.g., a "Ineligible" label) indicating cancellation of the user query by a human user (e.g., before the interactive assistant application is invoked within the invocation threshold) that causes the user query to be ineligible for evaluating the invocation stage of the interactive assistant application. Additionally, or alternatively, the plurality of predefined labels can include, for instance, a fourth label (e.g., an "Unknown" label) indicating, for instance, missing information from the metadata associated with the user query to classify the invocation stage of the interactive assistant application handling the user query. The number and format of labels included in the plurality of predefined labels, however, are not limited to descriptions herein.

In some implementations, as a working example, the system can process the metadata associated with the user query (e.g., the file including the invocation metadata) to determine whether the interactive assistant application is invoked is invoked successfully/satisfactorily (e.g., within the invocation threshold $\Delta T_1$). In some implementations, the system determines whether the interactive assistant is invoked within the invocation threshold $\Delta T_1$ based on whether an invocation time interval (t2–t1) between the aforementioned first time-stamp ($t_1$, which indicates a receiving time of an invocation event to invoke the interactive assistant application) and the second time-stamp ($t_2$, which indicates an invocation time at which the interactive assistant application is invoked) is within (e.g., less than or equal to) the invocation threshold ($\Delta T_1$).

For instance, the system can determine that the interactive assistant is invoked satisfactorily if the invocation time interval (e.g., $t_2-t_1$) between the first time-stamp ($t_1$) and the second time-stamp ($t_2$) is within the invocation threshold ($\Delta T_1$). In this case, the system can, for instance, assign an "invocation-good" label (or simply a "Good" label as described above) to rate an invocation behavior (or invocation stage) of the interactive assistant application for the user query, or other label indicating that the invocation behavior/stage of the interactive assistant application for the user query is satisfactory. As another example, the system can determine that the interactive assistant is not invoked satisfactorily if the invocation time interval (e.g., $t_2-t_1$) is beyond the invocation threshold ($\Delta T_1$). In this example, optionally, the system can assign, for instance, "invocation-bad" label (or simply a "Bad" label) to the invocation behavior (or invocation stage) of the interactive assistant application ("assistant invocation") for the user query, given that it takes too long for the interactive assistant application to be invoked which may indicate that the assistant invocation is too slow to be reliable.

In some implementations, the metadata associated with the user query (e.g., the invocation metadata) may not include the second time-stamp ($t_2$) as described above. For instance, the invocation metadata for the user query may include information indicating that no invocation event ("triggering event") is detected, without an error message. This can happen, for instance, when the spoken utterance includes no hotword that triggers the interactive assistant application, or the spoken utterance did include a hotword but a different interactive assistant application (having a different manufacturer, etc.) is invoked or triggered. In this case, the system can assign an "invocation-illegible" label (or simply an "Illegible" label) to the invocation behavior (or invocation stage) of the interactive assistant application for the user query. In some implementations, the user query assigned with the "invocation-illegible" label can be excluded from being used for evaluating the reliability of the interactive assistant application (that the user query is directed to), in situations where evaluation of the interactive assistant application is needed. In some implementations, an alert message indicating that the user query is classified as "illegible" (and/or that the invocation stage of the interactive assistant application for the user query is assigned an "invocation-illegible" label) can be rendered visually via a first output device (e.g., a display of a mobile phone, of a laptop, etc.) and/or audibly via a second output device (e.g., a speaker of a desktop, etc.).

In some implementations, as another instance, the invocation metadata for the user query may include information indicating that an invocation event is detected, but with an error message indicating a failure to open/launch the interactive assistant application. This can happen, for instance, when the spoken utterance includes a hotword detected using a hotword model that the interactive assistant application includes or accesses, but there is an error in launching the interactive assistant application or causing the GUI element (e.g., icon, virtual character, etc.) representing the interactive assistant application to be rendered. In this case, the system can assign an "invocation-bad" label to the invocation behavior (or invocation stage) of the interactive assistant application for the user query.

It is noted that, in both situations where the invocation metadata (for the user query) includes information indicating that no invocation event is detected and without an error, and where the invocation metadata includes information indicating that an invocation event is detected but with an error message indicating a failure to open the interactive assistant application, there may be no visual or audible representation rendered via the client device informing a user of the user query that the interactive assistant application is ready for user interaction. It is further noted that, in these situations, the metadata associated with the user query may not include other types of metadata such as the input-receiving metadata (may also be referred to as "input-recognition metadata" or "input metadata", etc.), response-generation metadata (may also be referred to as "processing metadata", "query processing metadata", "response-receiving metadata", etc.), and/or the response-rendering metadata (may also be referred to as "responding metadata", etc.), as described elsewhere in this disclosure. This is because failure of invoking the interactive assistant application can cause processing of the user query to be paused or stopped at the invocation stage of the interactive assistant application.

In some implementations, the invocation metadata can have a missing/lost part. For instance, the metadata associated with the user query can include an error message that information (e.g., "$t_2$") recording the invocation behavior of the interactive assistant application for user query is not logged correctly or is lost during data transmission. In this case, the system can assign an "invocation-unknown" label (or simply an "unknown" label) to the invocation behavior (or invocation stage) of the interactive assistant application for the user query. In some implementations, the user query assigned with the "invocation-unknown" label can be excluded from being used for evaluating the reliability of the interactive assistant application (that the user query is directed to), in situations where evaluation of the interactive assistant application is needed/performed.

In some implementations, the metadata associated with the user query (or the file) can include input-receiving metadata indicating whether the interactive assistant application recognizes the user query satisfactorily. In some implementations, processing the input-receiving metadata associated with the user query can include: processing the input-receiving metadata associated with the user query to assign one of the aforementioned plurality of predefined labels (or a different set of labels) to an input-receiving stage of the interactive assistant application for the user query. For instance, the first label (e.g., a "Good" label) can be assigned to the input-receiving stage of the interactive assistant application for the user query, indicating input-receiving stage of the interactive assistant application in response to the user query is completed with a threshold of time for input recognition (shortly as "input-recognition threshold"). Alternatively, the second label (e.g., a "Bad" label) can be assigned to the input-receiving stage of the interactive assistant application for the user query, indicating input-recognition of the user query using the interactive assistant application is beyond the input-recognition threshold, or indicating a failure of the interactive assistant application to recognize the content of the user query. Alternatively, the third label (e.g., an "Ineligible" label) indicating cancellation of the user query by a human user (e.g., before the interactive assistant application recognizes the user query within the input-recognition threshold) that causes the user query to be ineligible for evaluating the input-receiving stage ("input stage") of the interactive assistant application. Alternatively, the fourth label (e.g., an "Unknown" label) can be assigned, indicating, for instance, missing information from the metadata associated with the user query to classify the input-receiving stage of the interactive assistant application handling the user query.

In some implementations, as a working example, the input-receiving metadata can include a third time-stamp ($t_3$) indicating a receiving time at which an input event (e.g., a tapping or clicking event at a user interface of the interactive assistant application to enter a typed input provided via an input field of the user interface) to provide the user query is provided to the interactive assistant application. Additionally, or alternatively, the input-receiving metadata can include a fourth time-stamp ($t_4$) indicating an input-recognized time at which content of the user query is recognized. In some implementations, the fourth time-stamp ($t_2$) can be a time at which a first input-recognition condition and/or a second input-recognition condition (different from the first input-recognition condition) are satisfied.

The first input-recognition condition can be satisfied, for instance, in response to a transcription of a spoken utterance that captures the user query being rendered at a user interface of the interactive assistant application. Depending on the type of user input that provides the user query, the first input-recognition condition can be satisfied, for instance, in response to content of a typed user input that provides the user query being rendered at the user interface of the interactive assistant application. The second input-recognition condition can be satisfied in response to, for instance, no user interruption (e.g., query cancellation) is received within a predetermined period of time after the system receives the user query.

In some implementations, processing the metadata associated with the user query can further include processing the input-receiving metadata indicating whether the interactive assistant application recognizes the user query satisfactorily (block 3043). For instance, the system can process the metadata associated with the user query (e.g., the input-receiving metadata) to determine whether the interactive assistant application recognizes the user query within the "input-recognition threshold" ($\Delta T_2$). In some implementations, the system determines whether the interactive assistant recognizes the user query satisfactorily based on whether an input-recognition time interval between the third time-stamp ($t_3$) indicating the receiving time of the aforementioned input event and the fourth time-stamp ($t_4$) indicating the input-recognized time at which content of the user query is recognized is within (e.g., less than or equal to) the input-recognition threshold ($\Delta T_2$).

For instance, the system can determine that the interactive assistant recognizes content of the user query satisfactorily if the input-recognition time interval (e.g., $t_4$–$t_3$) between the third time-stamp ($t_3$) and the fourth time-stamp ($t_4$) is within the input-recognition threshold ($\Delta T_2$). In this case, the system can, for instance, assign an "recognition-good" label (or "input-good" label, or simply a "good" label) to an input-recognition behavior (or input-receiving stage) of the interactive assistant application for the user query, or any other appropriate label indicating that the input-recognition behavior/stage of the interactive assistant application for the user query is satisfactory. As another example, the system can determine that the interactive assistant does not recognize the user query satisfactorily if the input-recognition time interval (e.g., $t_4$–$t_3$) is beyond the input-recognition threshold ($\Delta T_2$). In this example, optionally, the system can assign, for instance, "recognition-bad" label to the input-recognition behavior (or input-receiving stage) of the interactive assistant application for the user query, given that it takes too long for the interactive assistant application to recognize content of the user query.

In some implementations, the input-receiving metadata may not include the third time-stamp ($t_3$) and/or the fourth time-stamp ($t_4$) as described above. For instance, the input-receiving metadata for the user query may include information indicating that no input event is detected from the user subsequent to the triggering/invocation event, without an error message. This can happen, for instance, when the user provides a silent speech or a very low-voiced speech in a noisy environment, etc. This can also happen, when the user provides no speech or other types of user input, within a predetermined input-receiving period during which the interactive assistant application is invoked/activated to receive and process user input/queries (and then may return back to the passive listening state as described above). This can also happen, for instance, the user entered the user query (or a portion thereof) at the input field of the user interface of the interactive assistant application but deleted the user query without sending or canceled the user query by exiting the user interface, etc.

As another example, the input-receiving metadata for the user query may include information indicating that an input event is detected within the predetermined input-receiving period, but the user canceled the user query. For instance, the user may have canceled the user query after the user query is submitted to the interactive assistant application via the input event, or in the middle of providing the user query via a spoken utterance, etc. In some implementations, partial recognition of the user query may have been rendered via a user interface of the interactive assistant application.

In the above situations, the system can assign an "recognition-illegible" label to the input-recognition behavior (or input-receiving stage) of the interactive assistant application for the user query. In some implementations, the user query assigned with the "recognition-illegible" label can be excluded from being used or retrieved for evaluating the reliability of the interactive assistant application (that the user query is directed to), in situations where evaluation of the interactive assistant application is needed.

In some implementations, as another instance, the input-receiving metadata for the user query may include information indicating that an input event is detected, but with an error message indicating a failure of the interactive assistant application in recognizing the user query from the input event. This can happen, for instance, when the ASR model is currently unavailable for recognizing a speech capturing the user query, or the ASR model fails to respond to the user query, etc. In this case, the system can assign an "input-recognition bad" label to the input-recognition behavior (or input-receiving stage) of the interactive assistant application for the user query.

In some implementations, the input-receiving metadata indicating whether the interactive assistant application recognized content of the user query satisfactorily can have a missing/lost part. For instance, the metadata associated with the user query can include an error message that information recording the input-recognition behavior of the interactive assistant application for user query is not logged correctly or is lost during data transmission. In this case, the system can assign an "input-recognition unknown" label to the input-recognition behavior (or input-receiving stage) of the interactive assistant application for the user query. In some implementations, the user query assigned with the "input-recognition unknown" label can be excluded from being used for evaluating the reliability of the interactive assistant application (that the user query is directed to), in situations where evaluation of the interactive assistant application is needed.

In some implementations, additionally, or alternatively, the metadata associated with the user query (or the file) can include response-generation metadata indicating whether a response responsive to the user query is generated (e.g., using a local assistant component) or received (e.g., from a remote assistant component, e.g., cloud-based LLM) within a certain temporal period using the interactive assistant application. In some implementations, the response-generation metadata can include a fifth time-stamp ($t_5$) indicating a starting time that the user query is processed to generate a response responsive to the user query. Additionally, or alternatively, the response-generation metadata can include a sixth time-stamp ($t_6$) indicating an ending time at which the response responsive to the user query is generated/received/determined. In some implementations, the fifth time-stamp ($t_5$) can be subsequent to the fourth time-stamp ($t_4$) as described above, or can be approximately the same as the fourth time-stamp ($t_4$). In some implementations, the sixth time-stamp ($t_6$) can be a time at which a response responsive to the user query is derived from model output of a generative model (e.g., a large language model, "LLM"), or a time at which a command is determined by an NLU engine (as described above) and to be executed/fulfilled using the fulfillment engine (as described). However, this is not intended to be limiting. For instance, the sixth time-stamp ($t_6$) can be a time at which a first letter/word of the response is rendered at the client device, at which a sound (e.g., "beep") is rendered to remind a user of the user query that an answer to the user question in the user query is ready, at which a pose of a virtual character representing the interactive assistant application is changed to indicate that a response to the user query is ready to be rendered, etc.

In some implementations, processing the metadata associated with the user query can further include processing the response-generation metadata indicating whether the interactive assistant application recognizes the user query satisfactorily (block 3045). For instance, the system can process the response-generation metadata associated with the user query to determine whether the interactive assistant application generates a response responsive to the user query within a threshold of time for response generation (shortly as "response-generation threshold", $\Delta T_3$). In some implementations, the system determines whether the interactive assistant generates the response responsive to the user query satisfactorily based on whether a response-generation time interval between the fifth time-stamp ($t_5$) and the sixth time-stamp ($t_6$) is within (e.g., less than or equal to) the response-generation threshold ($\Delta T_3$).

For instance, the system can determine that the interactive assistant generates a response responsive to the user query satisfactorily if the response-generation time interval (e.g., $t_6-t_5$) between the sixth time-stamp ($t_6$) and the fifth time-stamp ($t_5$) is within the response-generation threshold ($\Delta T_3$). In this case, the system can, for instance, assign an "response-generate good" label (or simply the "good" label as described above) to a response-generation behavior (or response-generation stage) of the interactive assistant application for the user query, or any other appropriate label indicating that the response-generation behavior/stage of the interactive assistant application for the user query is satisfactory. As another example, the system can determine that the interactive assistant does not generate a response satisfactorily if the response-generation time interval (e.g., $t_6-t_5$) is beyond the response-generation threshold ($\Delta T_3$). In this example, optionally, the system can assign, for instance, "response-generation bad" label ("bad" label) to the response-generation behavior (or response-generation stage) of the interactive assistant application for the user query, given that it takes too long for the interactive assistant application to be recognizes content of the user query.

In some implementations, the system can assign the "response-generation bad" label to rate the response-generation behavior/stage of the interactive assistant application based on one or more components (e.g., NLU engine, NLU model, LLM, LLM engine, etc.) of the interactive assistant application fails to function appropriately or are unavailable/unresponsive in processing the user query to generate a response responsive to the user query.

In some implementations, the response-generation metadata may not include the fifth time-stamp ($t_5$) and/or the sixth time-stamp ($t_6$) as described above. For instance, the response-generation metadata for the user query may include information indicating that the processing of the user query to generate a response is canceled by a user of the user query before the response-generation threshold ($\Delta T_3$) is reached and without an error message indicating malfunction of the interactive assistant application. In this case, the system can assign an "response-generation illegible" label to the response-generation behavior/stage of the interactive assistant application for the user query. In some implementations, the user query assigned with the "response-generation illegible" label can be excluded from being used or retrieved for evaluating the reliability of the interactive assistant application (that the user query is directed to), in situations where evaluation of the interactive assistant application is needed.

In some implementations, the response-generation metadata indicating whether the interactive assistant application generates a response responsive to the user query satisfactorily can have a missing/lost part. For instance, the metadata associated with the user query can include an error message that information recording the response-generation behavior of the interactive assistant application for user query is not logged correctly or is lost during data transmission. In this case, the system can assign an "response-generation unknown" label to the response-generation behavior/stage of the interactive assistant application for the user query. In some implementations, the user query assigned with the "response-generation unknown" label can be excluded from being used or retrieved for evaluating the reliability of the interactive assistant application (that the user query is directed to), in situations where evaluation of the interactive assistant application is needed.

In some implementations, the metadata associated with the user query (or the file) can include response-rendering metadata indicating whether the response responsive to the user query is rendered satisfactorily using the interactive assistant application. In some implementations, the response-rendering metadata can include a seventh time-stamp ($t_7$) indicating a starting time for rendering the response responsive to the user query. Additionally, or alternatively, the response-rendering metadata can include an eighth time-stamp ($t_8$) indicating an ending time at which the response responsive to the user query is fully rendered. In some implementations, the seventh time-stamp ($t_7$) can be approximately the same as the sixth time-stamp ($t_6$) as described. But this is not required.

In some implementations, processing the metadata associated with the user query can further include processing the response-rendering metadata indicating whether the interactive assistant application causes a response responsive to the user query to be rendered satisfactorily (block 3047). For instance, the system can process the response-rendering metadata associated with the user query to determine whether the interactive assistant application renders the response responsive to the user query within a threshold of time for response rendering (shortly as "response-rendering threshold", $\Delta T_4$). In some implementations, the system determines whether the interactive assistant renders the response responsive to the user query satisfactorily based on whether a response-rendering time interval between the fifth time-stamp ($t_5$) and the sixth time-stamp ($t_7$) is within (e.g., less than or equal to) the response-rendering threshold ($\Delta T_4$).

For instance, the system can determine that the interactive assistant renders a response responsive to the user query satisfactorily if the response-rendering time interval (e.g., $t_8-t_7$) between the eighth time-stamp ($t_8$) and the seventh time-stamp ($t_7$) is within the response-generation threshold ($\Delta T_4$). In this case, the system can, for instance, assign an "response-rendering good" label to rate a response-rendering behavior/stage of the interactive assistant application for the user query, or any other appropriate label indicating that the response-rendering behavior/stage of the interactive assistant application for the user query is satisfactory. As another example, the system can determine that the interactive assistant does not generate a response satisfactorily if the response-rendering time interval (e.g., $t_8-t_7$) is beyond the response-rendering threshold ($\Delta T_4$). In this example, optionally, the system can assign, for instance, "response-rendering bad" label to the response-rendering behavior/stage of the interactive assistant application for the user query, given that it takes too long for the interactive assistant application to render response responsive to the user query.

In some implementations, the system can assign the "response-rendering bad" label to rate the response-rendering behavior/stage of the interactive assistant application based on one or more components (e.g., a rendering, etc.) of the interactive assistant application fails to function appropriately or are available/unresponsive.

In some implementations, the response-rendering metadata may not include the eighth time-stamp ($t_8$) and/or the seventh time-stamp ($t_7$) as described above. For instance, the response-rendering metadata for the user query may include information indicating that the rendering of the response is canceled by a user of the user query before the response-rendering threshold ($\Delta T_3$) is reached and without an error message indicating malfunction of the interactive assistant application. In this case, the system can assign an "response-rendering illegible" label to the response-rendering behavior/stage of the interactive assistant application for the user query. In some implementations, the user query assigned with the "response-rendering illegible" label can be excluded from being used or retrieved for evaluating the reliability of the interactive assistant application (that the user query is directed to), in situations where evaluation of the interactive assistant application is needed.

In some implementations, the response-rendering metadata indicating whether the interactive assistant application renders a response responsive to the user query satisfactorily can have a missing/lost part. For instance, the metadata associated with the user query can include an error message that information recording the response-rendering behavior of the interactive assistant application for user query is not logged correctly or is lost during data transmission. In this case, the system can assign an "response-rendering unknown" label to the response-rendering behavior/stage of the interactive assistant application for the user query. In some implementations, the user query assigned with the "response-rendering unknown" label can be excluded from being used or retrieved for evaluating the reliability of the interactive assistant application (that the user query is directed to), in situations where evaluation of the interactive assistant application is needed.

In some implementations, the system can determine the classification category to which the user query belongs based on the label(s) assigned to the invocation stage, input-receiving stage, response-generation stage, and/or the response-rendering stage, of the user query (block 3049).

In some implementations, the classification category is one of a plurality of predefined classification categories (e.g., "good", "bad", "ineligible", "unknown"). The plurality of predefined classification categories include, for instance, a first classification category ("good") indicating that the interactive assistant application successfully responds to the user query, and a second classification category ("bad") indicating that the interactive assistant application didn't respond to the user query, the interactive assistant application responds to the user query but not within a predefined response threshold, or any of the aforementioned invocation/input-recognition/response-generation/response-rendering stages takes longer than a corresponding threshold (e.g., the invocation threshold, input-recognition threshold, response-generation threshold, response-rendering threshold, etc.). The plurality of predefined classification categories can further include a third classification category (e.g., "ineligible") indicating that the user query is ineligible for evaluating reliability of the interactive assistant application, and/ or a fourth classification category (e.g., "unknown") indicating that there is missing part of metadata associated with one or more of the aforementioned invocation/input-recognition/response-generation/response-rendering stages of the interactive assistant application with respect to the user query.

In some implementations, the system can determine the classification category of the user query as "good" based on labels assigned to each of the four aforementioned stages (e.g., invocation, input-recognition, response-generation, response-rendering) of the interactive assistant application in association with the user query are "good" labels. In some implementations, the system can determine the classification category of the user query as "good" additionally based on a total time period from a beginning of the invocation stage to an end of the response-rendering stage of the interactive assistant application for the user query is within a predetermined total response threshold.

In some implementations, the system can determine the classification category of the user query as "ineligible" based on one or more labels assigned to one or more stages (e.g., invocation, input-recognition, response-generation, response-rendering) of the interactive assistant application in association with the user query include an "ineligible" label (e.g., "invocation-ineligible" label, etc.).

In some implementations, the system can determine the classification category of the user query as "unknown" based on one or more labels assigned to one or more stages (e.g., invocation, input-recognition, response-generation, response-rendering) of the interactive assistant application in association with the user query include an "unknown" label (e.g., "invocation-unknown" label, etc.).

In some implementations, the system can determine the classification category of the user query as "bad" based on at least one label assigned to one or more stages (e.g., invocation, input-recognition, response-generation, response-rendering) of the interactive assistant application in association with the user query is a "bad" label (e.g., "invocation-eligible" label, etc.), and no "ineligible" or "unknown" label is assigned to any of the four predefined stages (e.g., invocation, input-recognition, response-generation, response-rendering).

In various implementations, optionally, at block 306A, the system determines a classification label to the user query based on the determined classification category.

For instance, the system can assign a "good" label to the user query based on determining that the classification category of the user query is "good". This, for instance, requires a "good" label to be assigned to each of the invocation, input (also referred to as "input-recognition", etc.), processing (also referred to as "response-generation", etc.), and responding (also referred to as "response-rendering", etc.) stages of the interactive assistant application for handling the user query. The system can assign a "bad" label to the user query based on determining that the classification category of the user query is "bad". The system can assign an "ineligible" label to the user query based on determining that the classification category of the user query is "ineligible". The system can assign an "unknown" label to the user query based on determining that the classification category of the user query is "unknown".

Optionally, in various implementations, at block 308A, the system stores the classification label in association with the user query. For instance, the system can include the classification label determined for the user query in the metadata associated with the user query. Additionally, or alternatively, the system can store the user query in an entry of a user query database for the interactive assistant system, and the system can include the classification label in the entry for the user query in the user query database, along with other information (e.g., receiving time of the user query or other timestamps or events, etc.). It is noted that, in some implementations, the system can, but does not necessarily need to, store the user query in the user query database. In some implementations, the system can determine whether to store the user query in the user query database based on the determined classification category or the classification label determined for the user query. For instance, the system can store the user query in the user query database in response to determining that the user query belongs to the first or second classification category as described above, and not store the user query in the user query database in response to determining that the user query belongs to the third or fourth classification category as described above. The user query database can be applied to, for instance, determine reliability of the interactive assistant application in responding to user queries.

Optionally, in some implementations, one or more user queries can be retrieved from the user query database, for instance, to evaluate the reliability of the interactive assistant system (e.g., during a particular period of time).

Optionally, in some implementations, the user query database can store user queries directed to or received by different interactive assistant systems. The different interactive assistant systems can be developed by different vendors. Additionally or alternatively, the different interactive assistants can be developed by the same vendor but having different components and/or versions.

Figure 3B:
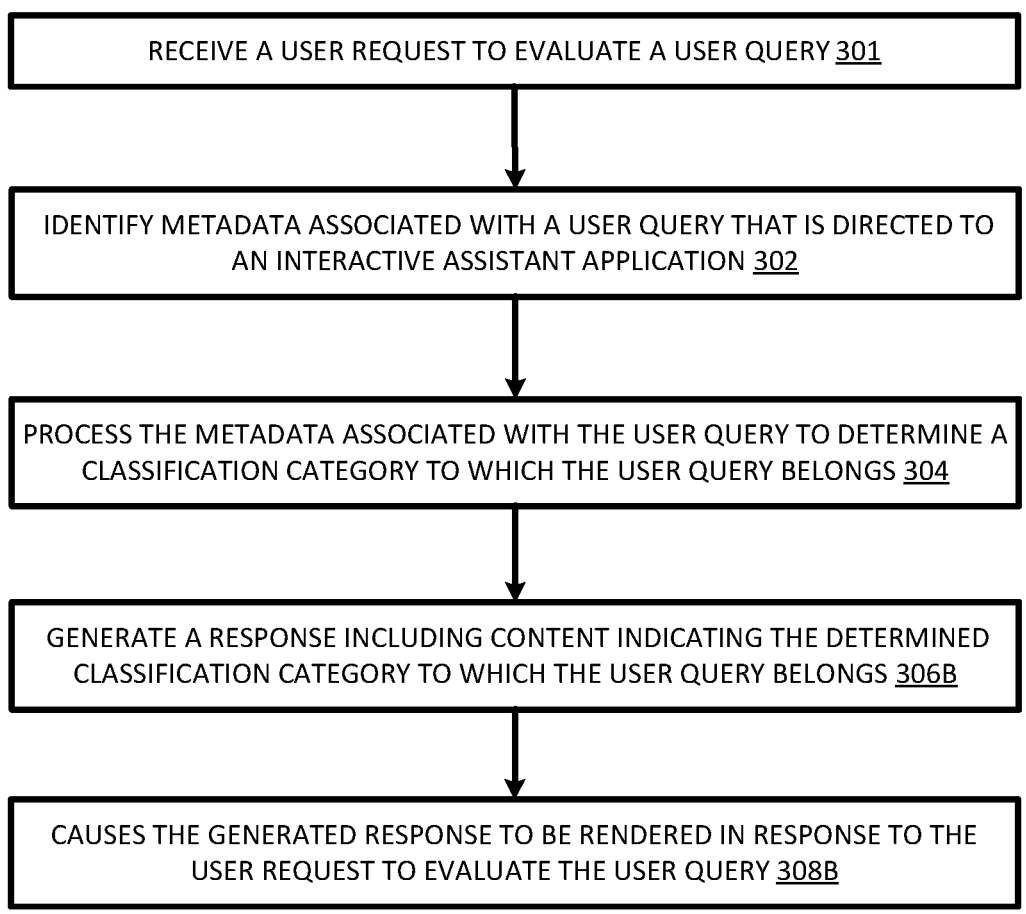
FIG. 3B depicts a flowchart illustrating another example method of evaluating a user query, in accordance with various aspects of the present disclosure.

Turning now to FIG. 3B, a flowchart illustrating another example scenario 300B of evaluating a user query is provided, in accordance with various aspects of the present disclosure. A system for performing the method 300B includes one or more processors, memory, and/or other component(s) of computing device(s) (e.g., client computing device 10A or 10B of FIG. 1A, one or more servers such as 12 in FIG. 1A, . . . , or 10N, and/or other computing devices). Moreover, while operations of the method 300B are shown in a particular order, this is not meant to be limiting. One or more operations may be reordered, omitted, and/or added.

In various implementations, at block 301, the system receives a user request to evaluate/classify a user query. For instance, the system can receive a user request, e.g., a spoken utterance such as "was the system reliable during this query?"

In various implementations, at block 302, the system identifies metadata associated with the user query. For example, the system can identify the metadata associated with the user query in response to receiving the user request of "was the system reliable during this query?"

In various implementations, at block 304, the system processes the metadata associated with the user query to determine a classification category to which the user query belongs. In some implementations, the system processes the metadata associated with the user query to determine a label that classifies an invocation stage of the interactive assistant application handling the user query, a label that classifies an input stage (e.g., "input-recognition" stage) of the interactive assistant application handling the user query, a label that classifies a processing stage (e.g., "response-generation" stage) of the interactive assistant application handling the user query, and/or a label that classifies a responding stage (e.g., "response-rendering" stage) of the interactive assistant application handling the user query.

In some implementations, the system determines the classification category for the user query based on the label(s) assigned to different stages of the interactive assistant application handling the user query. For instance, as described above, the system determines the classification category for the user query as being "Good", based on all labels assigned to the different stages (e.g., invocation, input, processing, responding) of the interactive assistant application handling the user query are "good" labels. The system can determine the classification category for the user query as being "Bad", based on at least one label assigned to at least one of the different stages (e.g., invocation, input, processing, responding) of the interactive assistant application handling the user query is a "Bad" label and there are no "ineligible" or "unknown" label(s) assigned to any of the four different stages of the interactive assistant application for the user query. The system can determine the classification category for the user query as being "ineligible", based on at least one label assigned to at least one of the different stages (e.g., invocation, input, processing, responding) of the interactive assistant application handling the user query is an "illegible" label. The system can determine the classification category for the user query as being "unknown", based on at least one label assigned to at least one of the different stages (e.g., invocation, input, processing, responding) of the interactive assistant application handling the user query is an "unknown" label. More detailed descriptions for the block 302 can be found elsewhere in this disclosure and repeated descriptions are omitted herein for the sake of brevity.

In various implementations, at block 306B, the system generates a response including content indicating the determined classification category to which the user query belongs. The response, for instance, can include a classification label (e.g., "Good", "Bad", "Ineligible", "unknown") determined for the user query. The classification label can be displayed in a pattern (e.g., color of the word content such as "Good" and/or background, font, size, etc.) designed respectively for the "Good", "Bad", "Eligible", "Unknown" classification categories. For instance, the response can include word content "Good" having a background color of green, word content "Bad" having a background color of red, word content "Ineligible" having a background color of yellow, or word content "unknown" having a background color of gray.

In various implementations, at block 308B, the system causes the generated response to be rendered in response to the user request to evaluate the user query. The generated response can be rendered, for instance, visually via a display of a client device, and/or audibly via a speaker of the client device.

Optionally, in some implementations, the system can store the determined classification category in association with the user query.

Figure 4:
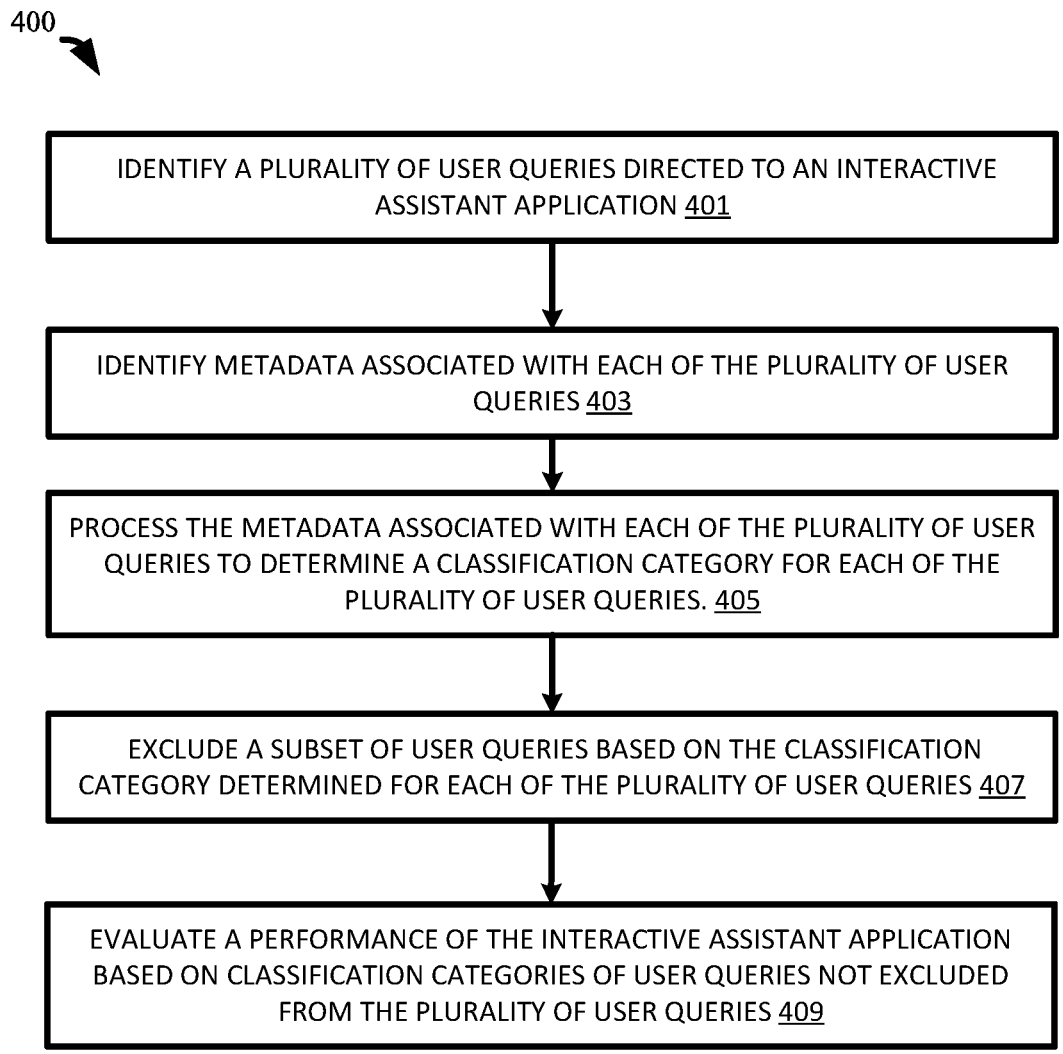
FIG. 4 depicts a flowchart illustrating another example method of evaluating an interactive assistant application using one or more user queries directed to the interactive assistant application, in accordance with various aspects of the present disclosure.

Turning now to FIG. 4, a flowchart illustrating an example method of evaluating an interactive assistant application using one or more user queries directed to the interactive assistant application is provided, in accordance with various aspects of the present disclosure, in accordance with various aspects of the present disclosure. A system for performing the method 400 includes one or more processors, memory, and/or other component(s) of computing device(s) (e.g., client computing device 10A, 10B, . . . , or 10N of FIG. 1A, one or more servers such as 12 in FIG. 1A, and/or other computing devices). Moreover, while operations of the method 400 are shown in a particular order, this is not meant to be limiting. One or more operations may be reordered, omitted, and/or added.

At block 401, the system identifies a plurality of user queries directed to an interactive assistant application. In some implementations, the system can identify the plurality of user queries automatically in response to a preconfigured request to periodically evaluate a surface reliability of the interactive assistant application. In some implementations, the system can identify the plurality of user queries in response to a user request to evaluate the surface reliability of the interactive assistant application. In some implementations, the system can identify the plurality of user queries received by the interactive assistant application installed at, or otherwise accessible via, a single client device or a particular client device. In some other implementations, the system can identify the plurality of user queries received by the interactive assistant application installed at, or otherwise accessible via, different client devices. The present disclosure is not limited thereto.

At block 403, the system identifies metadata associated with each of the plurality of user queries. The metadata associated with each of the plurality of user queries can include, as described above, invocation metadata, input-receiving metadata, response-generation metadata, and/or response-rendering metadata. Repeated descriptions of each of the invocation metadata, input-receiving metadata, response-generation metadata, and/or response-rendering metadata are omitted herein for the sake of brevity.

At block 405, the system processes the metadata associated with the plurality of user queries, to determine a classification category for each of the plurality of user queries. As described elsewhere in this disclosure, the classification category determined for a respective user query from the plurality of user queries can be a "Good" classification category based on all labels assigned to an invocation stage, an input-receiving stage, a response-generation stage, and a response-rendering stage, as described previously, of the interactive assistant application handling the respective user query are "good" labels. In some implementations, additionally, or alternatively, to fall within the "Good" classification category, a total responding period from invocation of the interactive assistant application (e.g., at $t_1$ as described above) for the respective user query to complete rendering (e.g., at $t_6$) of a response to the respective user query needs to satisfy a total threshold ($\Delta T_t$). For instance, the classification category determined for the respective user query can be a "Bad" classification category based on a total responding period (e.g., $t_6-t_1$) for the respective user query does not satisfy the total threshold ($\Delta T_t$), even if all labels assigned to the invocation stage, the input-receiving stage, the response-generation stage, and the response-rendering stage are "good" labels.

In some implementations, the classification category determined for the respective user query a "Bad" classification category based on at least one "bad" label is assigned to one or more stages of, the invocation stage, the input-receiving stage, the response-generation stage, and the response-rendering stage, of the interactive assistant application handling the respective user query, and there is no "eligible" nor "unknown" label assigned to the respective user query. Additionally, or alternatively, as described above, in some implementations, the classification category determined for the respective user query can be a "Bad" classification category based on a total responding period (e.g., $t_6-t_1$) for the respective user query does not satisfy the responding threshold ($\Delta T_t$), even if all labels assigned to the invocation stage, the input-receiving stage, the response-generation stage, and the response-rendering stage are "good" labels. Additionally, or alternatively, as described above, in some implementations, the classification category determined for the respective user query can be a "Bad" classification category based on detection of an authentication issue for the respective user query. For instance, for a given user query from the plurality of user queries, the metadata associated with the given user query can indicate that the interactive assistant application identifies, during processing of the given user query (e.g., at one of the invocation, input-receiving/recognition, response-generation, response-rendering stages, etc.), that authentication token(s) of a user of the given user query for the interactive assistant application has expired. In this case, the interactive assistant application, as indicated by the associated metadata, may have caused a default response such as "Something went wrong" to be rendered in response to the given user query, and the given user query can then be determined as falling within the "bad" ("Bad", "Bad-authentication issue" etc.) classification category.

In some implementations, the classification category determined for the respective user query can be an "ineligible" classification category based on at least one "ineligible" label being assigned to at least one of, the invocation stage, the input-receiving stage, the response-generation stage, and the response-rendering stage, of the interactive assistant application handling the respective user query. In some implementations, the classification category determined for the respective user query can be an "unknown" classification category based on at least one "unknown" label being assigned to at least one of, the invocation stage, the input-receiving stage, the response-generation stage, and the response-rendering stage, of the interactive assistant application handling the respective user query.

It is noted that, for different interactive assistant applications and/or for different client devices, the total threshold ($\Delta T_t$) can be preconfigured to have the same value or different values. In some implementations, the invocation threshold $\Delta T_1$, the input-recognition threshold $\Delta T_2$, the response-generation threshold $\Delta T_3$, and response-rendering threshold $\Delta T_4$ for the same interactive assistant applications can be different from one another. In some implementations, for different interactive assistant applications, the invocation threshold $\Delta T_1$ (the input-recognition threshold $\Delta T_2$, the response-generation threshold $\Delta T_3$, and/or response-rendering threshold $\Delta T_4$) can be preconfigured to have the same value or different values, and/or can be subsequently modified or changed after being preconfigured.

In some implementations, optionally, the system takes into consideration network issues (e.g., a weak or spotty signal) when determining a classification category for each of the plurality of user queries. For example, in some implementations, the system determines whether the interactive assistant application is offline (e.g., not connected to any network, such as the Internet) or online (e.g., connected to an Internet). In some implementations, the system may determine, with a high level of confidence, that the interactive assistant application is offline when processing a particular user query from the plurality of user queries (e.g., at block 401). In this case, the particular user query can be classified as "Ineligible" and can be excluded from being used to determine a surface reliability of the interactive assistant application.

In some implementations the system cannot determine that the interactive assistant application is offline with a high level of confidence. In this case, the system can determine that the particular user query falls within the "ineligible" classification category in response to the processing of the metadata associated with the particular user query indicating that the interactive assistant application rendered a default message such as "You need to be connected to use Assistant". The system can determine that the particular user query falls within the "bad" classification category in response to the processing of the metadata associated with the particular user query indicating that the interactive assistant application rendered a distinct default message such as "Something went wrong". Such default message can be rendered in response to the interactive assistant application encountering a network issue during any of the invocation, input-receiving, response-generation, or response-rendering stages. The system can determine that the particular user query falls within the "good" classification category in response to the processing of the metadata associated with the particular user query indicating that the interactive assistant application rendered a customized response to the particular user query within the total threshold ($\Delta T_t$) even if network issue is encountered. The present disclosure is not limited thereto.

At block 407, the system excludes a subset of user queries based on the classification category determined for each of the plurality of user queries. In some implementations the subset of user queries excluded from being applied to evaluate the interactive assistant application can each be determined as corresponding to an "unknown" classification category or an "ineligible" classification category.

At block 409, the system evaluates a performance (e.g., surface reliability) of the interactive assistant application based on classification categories of user queries not excluded from the plurality of user queries. For instance, the system can determine a surface response rate (e.g., 0.8) by dividing the total number (e.g., 400) of user queries that are from the plurality of user queries and that are determined to have a "good" classification category by the total number (e.g., 500) of user queries that are from the plurality of user queries and that are determined to either have a "good" or "bad" classification category. In other words, when calculating the surface response rate, the user queries from the plurality of user queries determined to fall within the "unknown" or "ineligible" classification category can be excluded from being used. This ensures evaluating the surface reliability of the interactive assistant application itself, by excluding subjective and external factors such as human cancellation which forces pausing or termination in processing of the user queries using the interactive assistant application.

Figure 5:
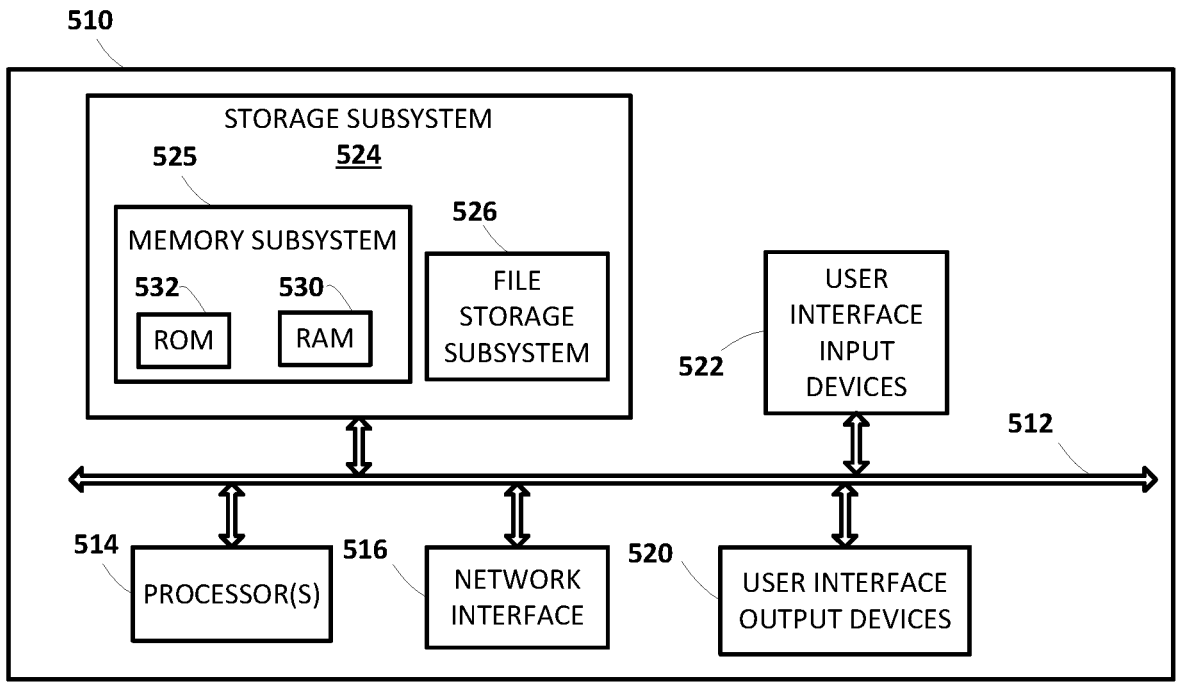
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant 104 component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

What is claimed is:

1. A method implemented using one or more processors, the method comprising:
   identifying metadata associated with a user query that is directed to an interactive assistant application;
   processing the metadata associated with the user query to determine a classification category to which the user query belongs,
   wherein processing the metadata associated with the user query includes:
      determining a respective label, from a plurality of predefined labels, for each of one or more stages of the interactive assistant application handling the user query, the one or more stages belonging to a plurality of predefined stages of the interactive assistant application, and
      determining the classification category based on:
         the respective label for each of the one or more stages of the interactive assistant application handling the user query, and
         on a total period of time from invocation of the interactive assistant application to complete rendering of a response responsive to the user query satisfying a total threshold; and
   generating, based on the classification category determined for the user query, an alert to one or more entities tasked with overseeing one of the plurality of predefined stages of the interactive assistant application handling the user query in response to the one of the plurality of predefined stages being determined to have a label indicating unsatisfactory handling of the user query during the one of the plurality of predefined stages.

2. The method of claim 1, wherein the plurality of predefined stages of the interactive assistant application include an invocation stage, an input-receiving stage, a response-generation stage, and a response-rendering stage, of the interactive assistant application handling the user query.

3. The method of claim 1, wherein determining the classification category based on the respective label for each of the one or more stages of the interactive assistant application handling the user query comprises: determining a first classification category for the user query based at least on each label for each of the plurality of predefined stages being the first label, the first classification category indicating a satisfactory overall surface performance of the interactive assistant application handling the user query.

4. The method of claim 1, wherein determining the classification category based on the respective label for each of the one or more stages of the interactive assistant application handling the user query comprises: determining a second classification category for the user query based on at least one second label being determined for at least one of the plurality of predefined stages, the second classification category indicating an unsatisfactory overall surface performance of the interactive assistant application handling the user query.

5. The method of claim 1, wherein the plurality of predefined labels further include a third label indicating that the respective stage of the interactive assistant application handling the user query renders the user query ineligible, and/or a fourth label indicating that the metadata associated with the user query misses information to classify the respective stage.

6. The method of claim 5, wherein determining the classification category based on the respective label for each of the one or more stages of the interactive assistant application handling the user query comprises:
   determining an ineligible classification category for the user query based on at least one third label being determined for at least one of the plurality of predefined stages, the ineligible classification category indicating the user query is ineligible to evaluate a surface reliability of the interactive assistant application.

7. The method of claim 5, wherein determining the classification category based on the respective label for each of the one or more stages of the interactive assistant application handling the user query comprises:
   determining a fourth classification category for the user query based on at least one fourth label being determined for at least one of the plurality of predefined stages, the fourth classification category indicating that information is missing from the metadata associated with the user query to determining the classification category for the user query.

8. The method of claim 1, further comprising:
receiving a user request to evaluate the user query, wherein identifying the metadata associated with the user query is in response to receiving the user request to evaluate the user query.

9. The method of claim 1, further comprising:
determining whether to apply the user query to evaluate a surface reliability of the interactive assistant application based on the classification category that the user query belongs to.

\* \* \* \* \*